INVENTORS:
Alfred Simmon
Louis L. Weisglass
BY Walter E. Woelheim
ATTORNEY.

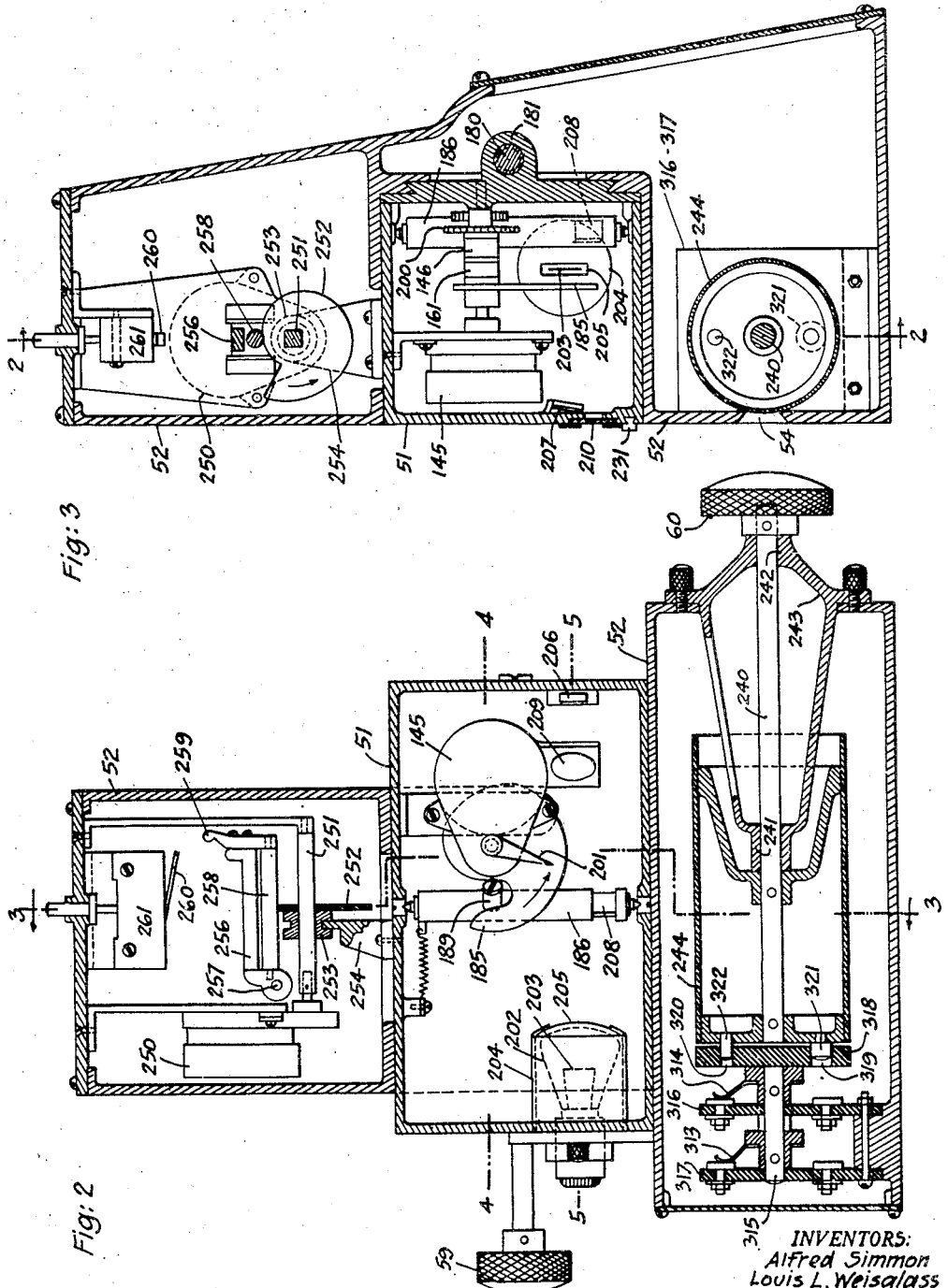

Feb. 22, 1949.  A. SIMMON ET AL  2,462,340
PRINT CONTROL DEVICE FOR PHOTOGRAPHIC ENLARGERS
Filed Oct. 22, 1947  7 Sheets-Sheet 4

INVENTORS:
Alfred Simmon
Louis L. Weisglass
BY
ATTORNEY.

Feb. 22, 1949.    A. SIMMON ET AL    2,462,340
PRINT CONTROL DEVICE FOR PHOTOGRAPHIC ENLARGERS
Filed Oct. 22, 1947                    7 Sheets-Sheet 5

INVENTORS:
Alfred Simmon
Louis L. Weisglass
BY
Walter E. Wollheim
ATTORNEY.

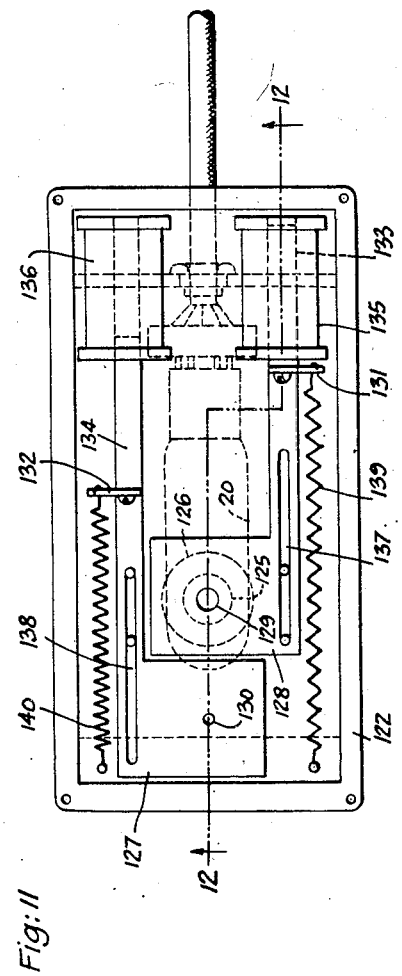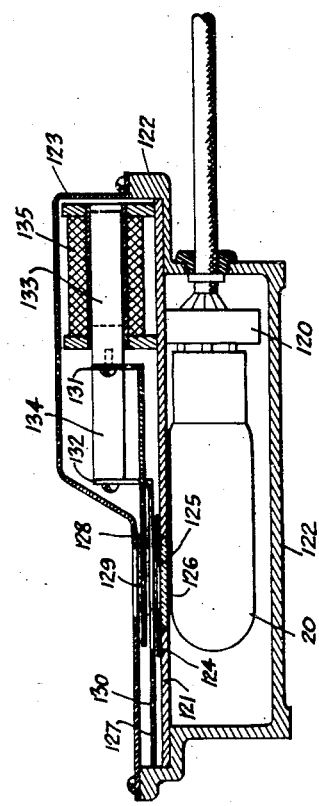

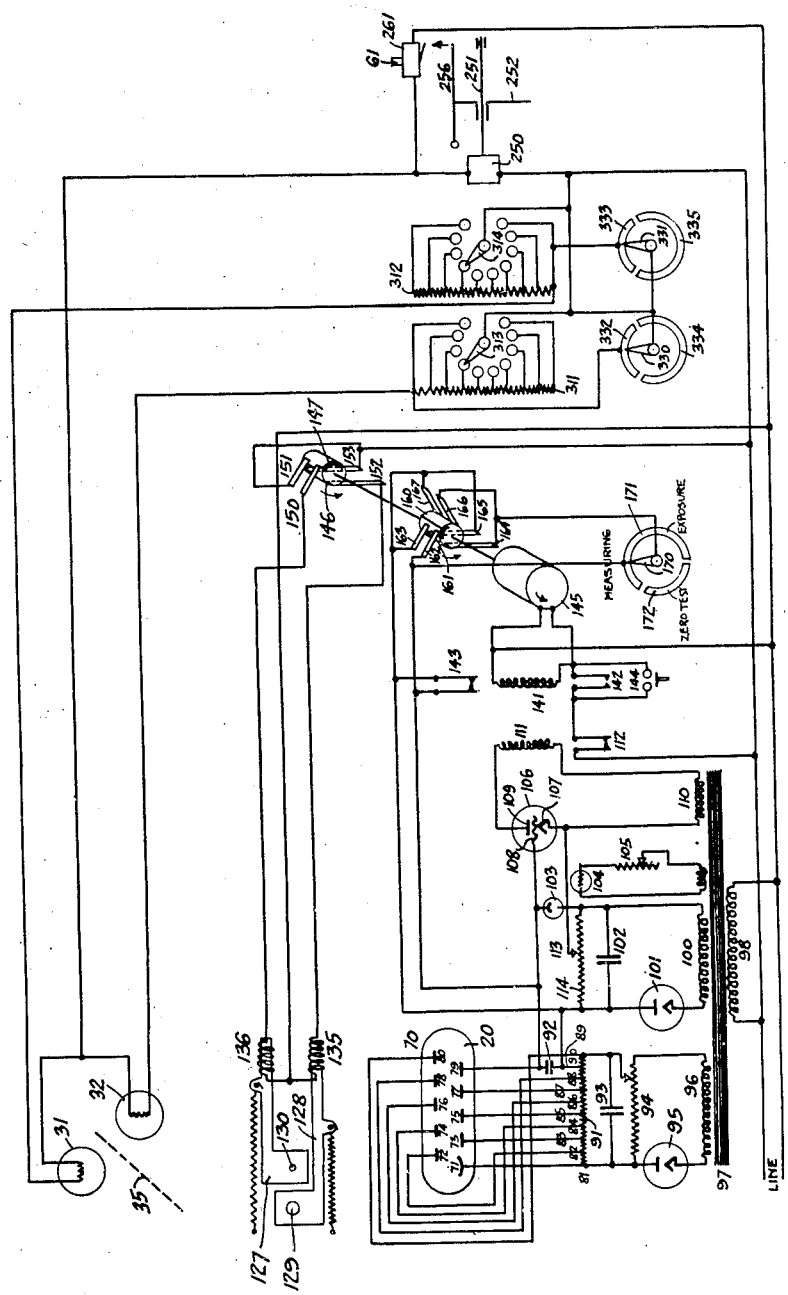

Patented Feb. 22, 1949

2,462,340

UNITED STATES PATENT OFFICE 2,462,340

PRINT CONTROL DEVICE FOR PHOTOGRAPHIC ENLARGERS

Alfred Simmon, Jackson Heights, and Louis L. Weisglass, New York, N. Y., assignors to Simmon Brothers, Inc., Long Island City, N. Y., a corporation of New York Application October 22, 1947, Serial No. 781,416

22 Claims. (Cl. 88—24)

The object of this invention is an improved print control device for photographic enlargers. It performs successively two functions, permitting the operator first, before making a print, to predict the density with which selected points of the image will be reproduced, and second, making a timed exposure. In a more refined embodiment, it also incorporates means to control the contrast of the print.

The device consequently consists of two principal parts, the density predictor and the timer. The density predictor comprises a photo-electric cell, a circuit connected thereto and a moving element actuated by said circuit, which indicates on a light intensity scale, calibrated in foot candles or the like, light intensity values. These light intensity values are fed into a computing device where they are combined with a selected exposure time value and converted into light intensity×time values, foot candles×seconds. A stepwedge unit is provided which comprises a support carrying a family of stepwedge prints, i. e., prints containing many small and usually rectangular areas of different densities which have received exposures of different light intensity×time values. One area of one stepwedge print is identified which received an exposure of the same light intensity×time value as indicated by the computing device, and its density is, therefore, the predicted density to be obtained with the measured light intensity, the selected exposure time and the type of sensitized material on which said stepwedge print happened to be made. After the predictions of several points of the image have turned out to the satisfaction of the operator, a print can be made by means of a time switch which forms part of the device. This time switch is operatively connected to the predictor, or more specifically to the computing device, so that the act of adjusting the predictor and/or the computer, automatically affects the setting of the time switch. In a more refined embodiment of this invention a contrast control device has been added, the construction of which is based on the property of certain variable contrast papers to change their contrast range in accordance with the color of the light to which they are exposed. The contrast control device consequently permits adjusting the color of the enlarger light from one color to another through all intermediate shades.

A preferred embodiment of this invention is illustrated in the attached figures.

In the drawings,

Fig. 2 is a longitudinal sectional view, through the main housing of the print control device along the plane of line 2—2 in Fig. 3;

Fig. 3 is a cross sectional view along the plane of line 3—3 in Fig. 2;

Fig. 11 is a plan view of a photocell housing, with its cover removed;

Fig. 12 is a sectional view along the plane of line 12—12 in Fig. 11;

Fig. 13 is a wiring diagram of the device; and

Like characters of reference denote similar parts throughout the several views and the following specification.

Enlarger

Figure 1:
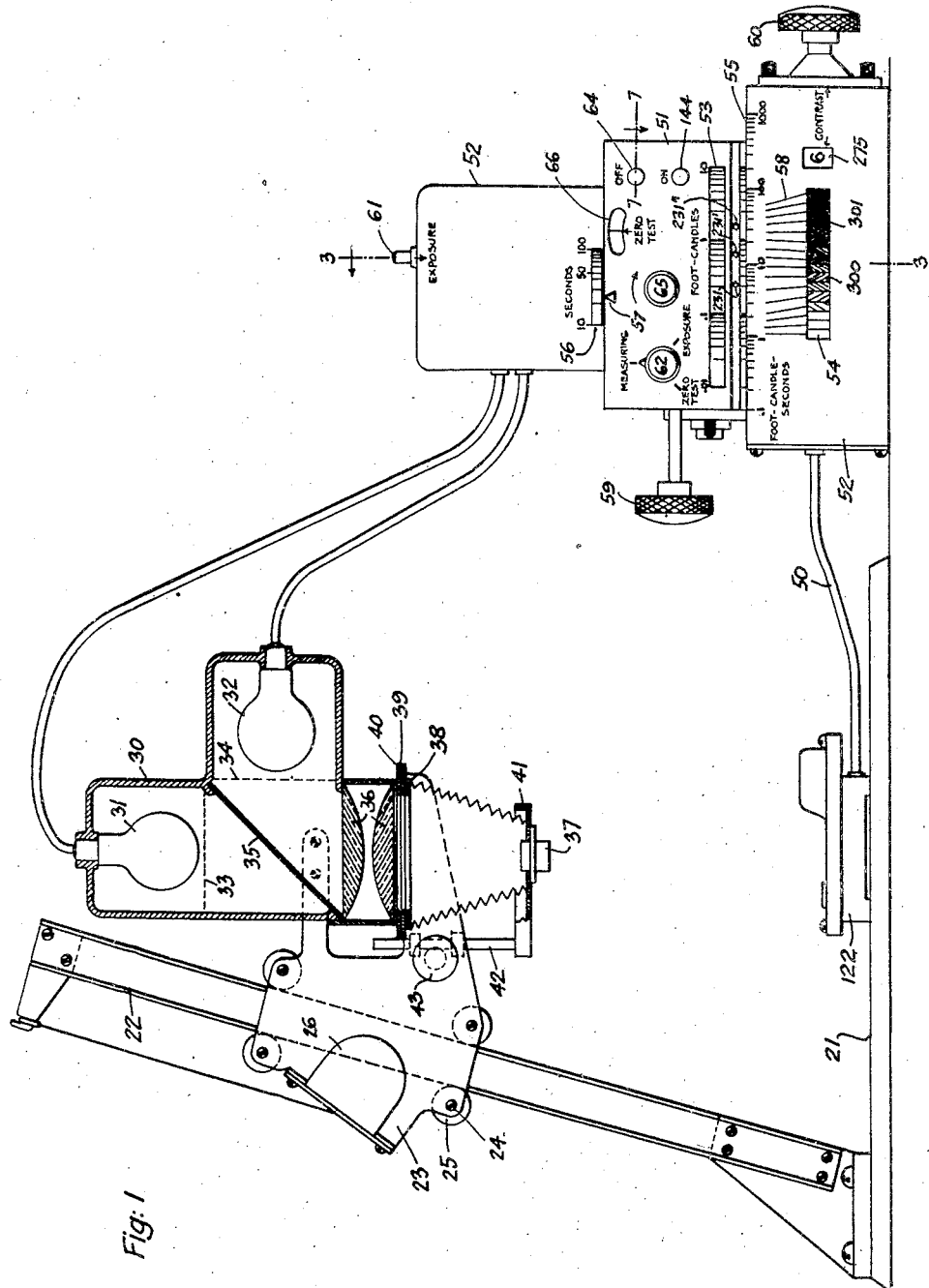
Fig. 1 is an elevational view of a photographic enlarger of substantially conventional design, its illuminating system shown in section, in connection with a print control device built in accordance with the principles of this invention.

A typical enlarger is shown in Fig. 1. This enlarger comprises a flat base 21 preferably made from plywood or the like. It supports an upright structure 22 which is either vertical or, preferably, slightly inclined, as shown. A piece of sensitized material, such as bromide paper, is during an exposure placed on base 21 which is sometimes called an easel. Mounted on the upper structure 22 is the projector carriage which usually comprises two flat steel plates 23 tied together by four studs 24. These studs serve, at the same time, as shafts for wheels or rollers 25, by means of which the projector carriage moves on the structure 22. The entire projector carriage is counterbalanced by a spring 26, preferably, of the type commercially available as sash weight balances.

The projector comprises a lamphousing, a focusing movement and a lens. The lamphousing as shown represents a modification used when a contrast control device is incorporated in the print control device. In the simplest form of the device a lamphousing or illuminating system as shown is not necessary, and a conventional illuminating system consisting of a housing containing one single lamp is all that is ordinarily needed. In other words, only one lamp 31 is used, and elements 33, 34 and 35 are omitted. Since illuminating systems of this type are well known, we have not shown one in Fig. 1, but have preferred to illustrate a modification which is adapted for contrast control. This modification comprises a housing 30 which is an aluminum casting or the like and contains two lamps 31 and 32. Filters of different colors 33 and 34 may be placed in front of the two respective lamps and element 35 is provided by which the two beams emanated by the two lamps can be superimposed.

In addition to the illuminating system the enlarger comprises, preferably, a double condenser 36, and an enlarging lens 37. A photographic negative or transparency 39 is held in place by a negative holder 40 consisting of two flat metal plates between which the negative can be sandwiched, and this holder with its negative is, during an exposure, placed on a film stage 38. The lens 37 is supported in a lens support 41 which again may be an aluminum casting and is supported by one or, preferably, two vertical guide rods 42. These guide rods and with them the lens carrier and the lens can be moved vertically for focusing purposes by means of a hand wheel 43. An operative connection between this hand wheel and the focusing rods may be formed in any convenient manner, for example, by a rack and pinion movement.

*Basic design of print control device*

The external appearance of the device can be seen in Fig. 1. It consists of a relatively small photocell housing 122 which can be placed at any selected point of the easel, and a main housing. A multiple conductor cable 50 forms an electrical connection between the two housings.

The main housing comprises two principal parts 51 and 52, movable relative to each other by means of hand wheel 59. Part 51 is of substantially rectangular cross section, but the cross section of part 32 is more complex and can best be seen in Fig. 3. Mounted within the first part 51 of this main housing is a light intensity indicator which includes an electrical circuit connected to the photocell by means of cable 50 and a moving element actuated by said circuit and indicating on a light intensity scale 53, which is calibrated in foot candles or the like, the intensity of the light which impinges upon the photocell. The second part contains a stepwedge unit which comprises a support movable by means of hand wheel 60 and carrying a number of stepwedge prints made on sensitized material of different contrast grades. Means such as a window 54 in the front wall of the housing are provided to make one of the stepwedge prints visible to an observer. The second principal part of the main housing also carries a scale 55 showing light intensity×time values, foot candles×seconds. This scale is so arranged that it is adjacent to the aforementioned light intensity scale 53 of the first principal part, and by virtue of the fact that the two parts are movable relative to each other a slide rule like computing device is formed.

One of the two principal parts, it being immaterial which one, of the main housing contains a time switch by means of which timed exposures can be performed after the predicted densities of the predicting device have turned out satisfactorily. This timer comprises release push button 61, a scale 56 calibrated in time values, seconds, affixed to one of the two parts of the main housing, and a mark 57 affixed to the other of said parts but adjacent to said scale and indicating exposure time values thereon. All scales have logarithmically spaced divisions and their dimensions are so chosen that values read on the light intensity×time scale are equal to those values on the light intensity scale with which they are in register, multiplied by the exposure time value indicated by the aforementioned mark 57 on the time scale 56.

Coordinating means, preferably a simple system of lines 58, are provided indicating the light intensity×time value of any area of the stepwedge print which has been made visible in window 54, so that the intensity of the light which impinges on that photocell is indicated by the moving element of the light intensity indicator, and can be traced from a division of the light intensity scale to a division of the adjacent light intensity×time scale with which it is in register and from there to the area of the visible stepwedge print which had been exposed to the same light intensity×time value.

In addition to the elements enumerated, the front wall of the main housing shows a hand wheel 62 of a three-position switch with the three respective positions "measuring," "exposure" and "zero test," a set of "on" and "off" push buttons 144 and 64 for the light intensity indicator, and a handwheel 65 and a window 66. The last-named two elements are used during the zero test, the significance of which will be explained later.

*Photocell unit*

Referring to Figs. 11 and 12, the photo-electric cell 20 is mounted in a conventional tube socket 120 which, in turn, is attached to a plate 121. This plate is mounted in a housing 122, the upper part of which is closed by a cover 123, cover 123 having been omitted in Fig. 11. Plate 121 supports directly above the photo-electric cell a thin plate 124 with a relatively large aperture 125. Between this aperture and the photo-electric cell there is a small disc of a diffusing glass 126. It is the purpose of this diffusing glass to prevent irregularities due to the fact that without it the light impinging upon the light sensitive electrode 71 may hit more or less sensitive spots thereon. By interposing this diffusing glass the entire area of this light sensitive electrode will be evenly illuminated.

Mounted on top of plate 121 are two electromagnetically controlled diaphragms 127 and 128. Diaphragm 128 has a medium-sized aperture 129 which is smaller than the aforementioned large aperture 125. In the example described here the area of aperture 129 is $\frac{1}{10}$ of the area of aperture 125. The diaphragm 127 has an aperture 130 which is still smaller and which in the same example has $\frac{1}{10}$ of the area of aperture 129 or $1/100$ of the area of aperture 125. Each of these diaphragms has the shape shown in Fig. 11, and the two diaphragms are arranged in slightly different planes as shown in Fig. 12. Each of these plates has an upturned lug 131 and 132, respectively, and to each of these upturned lugs there is attached an iron core 133 and 134. Two electromagnetic coils 135 and 136 are provided which, when energized, attract one of these iron cores, respectively. As shown in Fig. 11, coil 135 is represented as being energized and has thereby attracted iron core 133 which, in turn, places diaphragm 128 in a position in which its aperture 129 is directly above the photo-sensitive electrode 21 of the photo-electric cell. Each of the aperture plates has a slot 137 and 138, respectively, and each of these slots engages two guide pins which can be seen in Fig. 11. Return springs 139 and 140 are provided which return the diaphragm blades to their original positions as soon as the corresponding coil is deenergized.

The purpose of the arrangement by which the size of the light accepting aperture and therewith the sensitivity of the photocell to light, can be adjusted, will be explained in a later chapter.

*Light intensity indicator—Basic design*

While numerous ways are known at the present time to measure light intensities, the choice for the present purpose is limited because the illumination on the easel of the photographic enlarger can, and often does, assume exceedingly low values. For this reason, we use a photoelectric cell of the so-called electron multiplier type since complex amplifiers are not necessary with this cell in order to obtain high light sensitivity. The circuit associated with this cell, due to the very low light intensity to be measured, represents an additional problem.

It is known that it is expedient for this purpose to use a condenser in series with the photo-electric cell and to measure the time which it takes to charge or discharge this condenser. While it is theoretically unimportant whether this condenser is being charged or discharged during this process, more convenient circuit relations can be obtained by having the condenser charged and this is shown in the following example: The current that passes the photo-electric cell is substantially proportional to the intensity of the incident light. The charging or discharging time of the condenser, however, is inversely proportional to the current with which it is charged or discharged, and consequently for a circuit of this type charging or discharge times of the condenser for zero light intensity become infinite, and for low light intensities these times become very long. This is objectionable for a number of reasons; for example, with very long charging or discharging times, incidental small leakages may falsify the result completely. In order to overcome this condition, we provide two parallel, but otherwise independent, charging circuits for the condenser. The current passing the first circuit is controlled by the photo-electric cell and is at least substantially proportional to the light intensity to be measured. The current passing the second circuit is constant and entirely independent of the light intensity but may, of course, for convenience, be adjusted to a suitable value where it will be left during the operation of the device. The result of this arrangement is that for zero light values; i. e., absolute darkness, a definite condenser charging time is obtained and that by this expedient convenient and efficient circuit conditions can be easily arranged.

For reasons which will become apparent later, it is important to express the relation between light intensity and condenser charging time for a circuit of the above description. If we call C = condenser capacity
T = condenser charging time
E = condenser voltage
$i_1$ = condenser charging current through multiplier tube in $\mu a$. (micro-amps.)
$k$ = multiplier sensitivity in $\mu a$./foot candles
L = light intensity in foot candles (on easel surface)
$i_2$ = condenser charging current through auxiliary circuit (in $\mu a$.) and if we assume that the condenser is charged from a zero voltage, the condenser voltage E can be expressed as follows:

$$E = \frac{T}{C}(i_1 + i_2)$$

$$= \frac{i_2 T}{C}\left(\frac{i_1}{i_2} + 1\right)$$

or $$T = \frac{CE}{i_2}\left(\frac{1}{\frac{i_1}{i_2} + 1}\right)$$

For $i_1 = 0$; i. e., without any light reaching the photo-electric cell, we shall call the condenser charging time $T_0$. This time becomes $$T_0 = \frac{CE}{i_2}$$

This can be introduced into the formula for T:

$$T = T_0\left(\frac{1}{\frac{i_1}{i_2} + 1}\right)$$

or $$\frac{i_1}{i_2} = \frac{1}{\frac{T}{T_0}} - 1$$

For $i_1$ we can substitute KL, and obtain $$\frac{KL}{i_2} = \frac{1}{\frac{T}{T_0}} - 1$$

$$L = \frac{i_2}{K}\left(\frac{1}{\frac{T}{T_0}} - 1\right)$$

or $$\log L = \log \frac{i_2}{K} + \log\left(\frac{1}{\frac{T}{T_0}} - 1\right)$$

As will be seen later, based on this relationship, cams of very convenient configuration can be designed by means of which logarithmic light intensity values can be obtained. The convenience with which this can be done is based on the peculiar characteristics of the double condenser charging circuit as expressed by the above formulae and this is one of the principal advantages of this arrangement.

In order to measure the time needed for the condenser to be charged or discharged a very simple arrangement is provided consisting essentially of constant speed motor, preferably, of the type used for small clocks, and means to make the output shaft of this motor rotate during the time of the charging or discharging process. The rotary angle travelled by the output shaft of the motor is then a direct measure of the time consumed for the charging or discharging process. The output shaft of the motor drives, usually by means of a cam, a moving element which after terminating the charging or discharging process comes to rest at a division of the aforementioned light intensity scale.

An arrangement substantially as described in the preceding paragraph can, without difficulty, be made sufficiently sensitive for the purpose of measuring light intensity values in the plane of the enlarger easel. An arrangement of this type, however, must not only be sufficiently sensitive, but must also permit the measuring of light intensity values within an unusually wide range. The light intensity value in the easel plane depends upon numerous factors, such as the density of the negative at selected points, the magnification ratio and the F number to which the enlarging lens has been stopped down. Since each of these factors may vary within wide limits, it becomes necessary to provide an unusually wide range over which light intensities can be measured by the device. This is done by permitting the time measuring device to run not merely through one, but through several operating cycles. Automatic means are provided to change the sensitivity of the photocell, by adjusting the aperture size as described in a preceding paragraph for successive operating cycles of the time measuring device, and also to discharge the condenser automatically between successive periods. In other words, we start charging a condenser with the lowest photocell sensitivity, i. e., with the smallest aperture. If the light intensity is sufficiently high, the light measuring device will come to a standstill during this period, but if the light intensity is too low, the motor of the time measuring device will continue to rotate, will discharge the condenser and adjust the aperture of the photocell to the next smaller size, and will then automatically permit the condenser to be charged again. Since the light acceptance of the photocell is now much larger, a lower light intensity may be sufficient to charge the condenser within the second period, so that the motor of the time measuring device comes to a standstill. Should the light intensity be so exceedingly low that even during the second period the motor of the time measuring device will not come to a standstill, the condenser will again be automatically discharged, the size of the photocell aperture increased, and then the condenser charging cycle will be repeated for the third time.

*Electrical circuit*

The circuit comprises many elements such as tubes, resistors, condensers and others. The precise disposition of these elements within the housing of the device is not important and they have, therefore, been omitted from Figs. 2, 3, 4 and 5.

The electrical circuit is shown in Fig. 13. For convenience, it can be sub-divided into five parts as follows:

1. Supply circuit for multiplier tube and first condenser charging circuit.
2. Second condenser charging circuit.
3. Thyratron and first relay.
4. Push button and second relay.
5. Time measuring and multiple cycle arrangement.

These circuits will be described in that sequence.

*Supply circuit for multiplier tube and first condenser charging circuit*

The multiplier tube 20 comprises a vacuated vessel 70, a photo-emissive cathode 71, and nine electrodes 72 to 80. The cathode 71 and the electrodes 72 to 80 are connected to corresponding taps numbered 81 to 90 of the voltage divider 91. A condenser 92 is inserted into the second last of these connections, i. e., between points 79 and 89. The voltage divider is placed across the terminals of another condenser 93 which, in turn, receives its voltage from a potentiometer 94. This potentiometer is supplied with rectified current by means of a rectifying tube 95, and a transformer which has a secondary coil 96, an iron core 97 and a primary coil 98. The primary coil, in turn, is connected to an alternating current line.

As can be seen, the secondary coil 96 delivers an alternating current of a suitable voltage which, by means of rectifying tube 95, is rectified and impressed upon potentiometer 94. Depending upon the adjustment of this potentiometer, a certain portion of this rectified voltage reaches the condenser 93 which acts as a filter and converts the rectified uni-directional alternating current into direct current with only a small ripple. This D. C. voltage is then, by means of a voltage divider 91, divided into ten parts. Point 81 assumes the most negative potential and is connected to the photo-emissive anode of the multiplier. Going from left to right, subsequent points of the voltage divider become increasingly positive and each point has a positive voltage with respect to its left neighbor of approximately 100 volts. The last point 90 which is connected to the last electrode 80 of the multiplier tube is, of course, the most positive of all.

As a result of this arrangement, the few electrons which are released by the action of light from the cathode 71 are attracted to the next electrode 72 where they strike with sufficient velocity to release a number of secondary electrons. These secondary electrons are, in turn, attracted by the next electrode 73 where they release tertiary electrons and this process is repeated at each subsequent electrode. The number of the secondary electrons released at electrode 72 is larger than the number of primary electrons causing their release, and again the number of tertiary electrons released at 73 is larger than the number of secondary electrons, and the ability of the tube to "multiply" electrons is based on this fact. The current circulating in the last loop, i. e., between points 79 and 89 and between points 90 and 80 which charges condenser 92 becomes, therefore, comparatively heavy.

The light sensitivity of the tube depends upon the voltage imposed upon adjacent electrodes and, therefore, potentiometer 94, by which this voltage can be adjusted, provides a convenient means to adjust the sensitivity of the tube.

The sensitivity of the device can also be adjusted by changing the size of the light admitting aperture, and two electro-magnetically controlled diaphragm blades 127 and 128 serving this purpose are shown in Figs. 11 and 12. They are again shown above the multiplier tube 20 in Fig. 13.

It can be seen that current circulating in the last loop between points 79 and 89 and 90 and 80 causes condenser 92 to be charged. Condenser 92 is, by means to be shown later, short circuited before the measuring process begins, and the time required, after the removal of the short circuit, to charge it to predetermined voltage constitutes a measure of the light impinging upon the multiplier tube 20.

*Second condenser charging circuit*

The second condenser charging circuit is connected across the terminals of condenser 92 in parallel to the first charging circuit. Distinguished from the first charging circuit, however, the current within this second circuit is constant and entirely independent of the light impinging upon the photo-electric multiplier tube 20. The second circuit, therefore, comprises a second source of D. C. voltage and an element which keeps the current in the second charging circuit constant regardless of the voltage to which condenser 92 happens to be charged at any given instant.

The source of D. C. may be of any desired type and could, for example, be a battery. For convenience, however, we have chosen a transformer with a secondary coil 100, and rectifying tube 101 and a condenser 102. The secondary coil could, of course, be associated with its own core and its own primary coil, but it can also, and this is preferable, be mounted on the same iron core 97 which was already provided for the transformer which furnished current for the first charging circuit.

The current limiting device which keeps the current within the second charging current constant may be of one of several known types. For example, a screen grid tube has the property to keep the plate current constant within wide limits of plate voltages. We prefer to use as a current limiting element a second photo-electric cell 103 which is, in turn, illuminated by a small incandescent lamp 104 in series with a small rheostat 105. It must be emphasized that the second photo-electric cell 103 has no connection with the photo-electric multiplier tube 20 and is not exposed to the light emanating from the enlarger. This second photocell 103 is merely a convenient means of keeping the current within the second charging circuit constant.

Another possibility of an element which conducts constant current is based on the use of radio-active substances. If a pair of plates coated with radio-active substances are placed opposite each other, separated by a small air gap, the air between the two plates is ionized and thereby rendered current conductive. The magnitude of this current is more nearly constant than that of any other known device. It can be adjusted either by changing the separation of the plates or by inserting a shield. In the past, radio-active substances have been either very expensive, such as the derivates of radium itself, or rather ineffective, and therefore requiring an unduly large area, such as uranium compounds. In the future, however, artificially radio-activated materials may become available and, in particular, one of the radio-active isotopes of carbon appears to be promising in this respect.

The current circulating within the second charging circuit can be conveniently adjusted by changing the illumination of photocell 103 through manipulation of rheostat 105 which regulates the current passing incandescent lamp 104. Rheostat 105 can be adjusted from the front of the housing 51 of the main unit by means of hand wheel 65.

Circuits of this type are quite sensitive to accidental leakages and even the most perfect means of insulation cannot completely eliminate any leakage. It is, furthermore, virtually impossible to keep this leakage at a constant value and it may change from day to day, depending for example, upon temperature and humidity conditions. It is, therefore, a particular advantage of the double charging circuit as described here, that the leakage can easily be compensated for. In order to do this, the photo-electric multiplier tube 20 is first covered so that no light from the enlarger or any other source can reach it. In other words, the first charging circuit will then be currentless except for any accidental leakage. The condenser 92 is then charged by the second charging circuit alone. The time required to charge condenser 92 by the second charging circuit alone to a predetermined voltage can then be measured, and if this time differs from a standard, it can be adjusted by moving rheostat 105 in one direction or the other. If, for example, the leakage within the two condenser charging circuits has increased since the last adjustment, the charging time of condenser by the second charging circuit alone will usually be longer than the standard time, and in order to restore the former conditions, the charging current within the second charging circuit must be increased. This can be done by reducing the resistance of rheostat 105 so that lamp 104 becomes brighter and, consequently, photocell passes more current. An adjustment in the opposite direction, if desired, can, of course, be made in a corresponding manner.

Thyratron and first relay circuit

The purpose of this circuit is to provide means to indicate when the voltage of condenser 92 has reached a predetermined critical value. It consists of a thyratron tube 106, with a cathode 107, a grid 108, and an anode 109. This thyratron is energized by alternating current derived from a secondary coil 110 which is, preferably but not necessarily, mounted on the same iron core 97 as the two other secondaries 96 and 100 described above. The plate circuit of the thyratron is completed by a relay coil 111 which actuates a normally closed contact 112 to be described later. The grid 108 of the thyratron is connected to the positive terminal of the condenser 92 and, to complete the grid circuit the cathode 107 is connected to a sliding contact 113 of a resistance 114 connected across the terminal of condenser 102. It can be seen that the voltage of the thyratron grid 108 with respect to the cathode 107 consists of the voltage impressed upon condenser 92. The two voltages are of opposite polarity. A thyratron is usually non-conductive as long as its grid voltage with respect to the cathode is more negative than −2 volts and it becomes current conducting as soon as the grid voltage is less than −2 volts negative with respect to the cathode. The result of this arrangement is that as soon as the condenser voltage is larger than the voltage of the left half or resistance 114 −2 volts, the previously non-current conducting thyratron becomes current conducting, whereupon current begins to flow in relay coil 111.

Second relay and push button circuit

This circuit comprises a second relay consisting of a coil 141, a normally open contact 142, and a normally closed contact 143. The normally open contact 142 is connected parallel to the contacts of the normally open push button 144, and the two parallel pairs of contacts 142 and 144 are, in turn, connected in series on one side with the normally closed contacts 112 of the first relay and on the other side with a motor 145 of the time measuring device to be described in the next paragraph.

Contact 142, due to the fact that it is connected in parallel with push button 144, acts as a "hold in" contact; i. e., it keeps relay coil 141 energized once push button 144 has been closed for an instance. The second relay and push button circuit, therefore, works in the following manner: the operator depresses push button 144 for an instance, thereby energizing coil 141. This, in turn, closes contact 142 which keeps coil 144 energized even after the operator relinquishes push button 144. Contact 112 of the first relay is normally closed and, therefore, relay coil 141 as well as motor 145 remain energized until, by the action of the thyratron 106, coil 111 of the first relay is energized and opens normally closed contact 112. Thereupon coil 141 of the second relay becomes currentless, opens contact 142 and ceases to energize motor 145.

The purpose of normally closed contact 143 is to keep condenser 92 short circuited before the beginning of the charging process. It works in conjunction with an automatic rotating switch which will be described in the next paragraph.

*Time measuring and multiple cycle arrangement*

The main element of this circuit is a constant speed motor with an output shaft which is kept rotating for the time during which condenser 92 is charged to a predetermined voltage. This motor is, preferably, a small synchronous motor of the type used for clock works or the like. Various means are available to make the output shaft of this motor rotate during the charging time of condenser 92. For example, between the motor and the output shaft there may be an electromagnetic clutch operated by the action of the second relay, or the following means may be used: Clock motors are commercially available with a built in magnetically operated gear shift automatically engaging and disengaging a gear train when the motor is energized and deenergized. As soon as the motor is deenergized, the drive shaft is free to be returned to the starting position by suitable means such as a spring or thyratron. In the example illustrated in the drawing, a motor of this type has been used.

The angle travelled by the output shaft of this motor is a direct measure of the charging time of condenser 92. It was explained above that, in order to get the necessary wide range of light intensities to be measured, an expedient is resorted to, which comprises means to have the condenser 92 run through its charging cycle several times but with increasingly large light accepting apertures placed in front of the photoelectric cell. This necessitates two automatic switches operatively connected with the output shaft of motor 145, the first of these switches changing automatically the light accepting aperture of the photocell for successive operating cycles, and the second of these switches short circuiting condenser 92 between operating cycles.

The first of these automatic switches comprises a cylindrical body 146 made from insulating material and carrying a segment 147 made from current conducting material. Two pairs of contacts 150 and 151, and 152 and 153 are sliding on this cylindrical body. It is assumed that the output shaft of motor 145 rotates in a counter-clockwise direction, and it can be seen that in the position shown in Fig. 13, contacts 150 and 151 are electrically connected by means of the current conducting strip 147 mounted on insulating cylinder 146. The consequence of this arrangement is that now coil 136 within the photocell housing receives current, thereby shifting diaphragm plate 127 in front of the photocell. This plate has an aperture 130 which is small and which, therefore, renders the photocell least sensitive to light. As soon as the operator, by depressing push button 144, starts the condenser charging process and simultaneously the rotation of output shaft of motor 145, cylindrical body 146 with current conducting strip 147 continues to rotate. As long as 147 conductively connects 150 and 151, aperture 130 remains in front of the photocell and limits its light acceptance. After the output shaft of motor 145 has rotated a certain angle, strip 147 opens the circuit of coil 136, and closes the circuit of the other coil 135 by connecting contact 152 and 153. This, in turn, places diaphragm plate 128 with its larger aperture 129 in front of the photocell rendering it correspondingly more light sensitive. Upon further rotation of the output shaft of motor 145, the connection between contacts 152 and 153 is opened, thereby deenergizing coil 135. The light acceptance of the photocell is now determined by the largest opening 125 in the top plate of the photocell housing 122, see Fig. 12.

A substantially similar arrangement is provided which automatically short circuits condenser 92 between the successive operating cycles. A cylindrical body 160 made from insulating material carries a current conducting strip 161; three pairs of contacts 162, 163 and 164, 165, and 166, 167 are disposed around the periphery of the cylindrical body 161. These three pairs of contacts are connected in parallel to each other as well as in parallel to the normally closed pair of relay contacts 143 of the second relay described in the preceding paragraph. It will be clear that as long as any of these contacts are closed, condenser 92 is automatically discharged, and that it is necessary to have all four contacts open simultaneously to start a charging cycle of this condenser.

As soon as an operator depresses push button 144, he energizes relay coil 141 thereby opening normally closed contact 143. At this time, i. e., in the position as shown in Fig. 13, the condenser is still short circuited by the connection between contacts 162 and 163, but this connection is opened after the output shaft of motor 145 has travelled a small angle in a counter-clockwise direction. The condenser can now be charged. After the end of the first charging process, the current conducting strip 161 connects contacts 164 and 165, thereby discharging the condenser. This process is repeated, and after the second charging cycle the condenser is again discharged when current conducting strip 161 automatically connects contacts 166 and 167.

It has been explained above that the leakage of the device can be tested by letting the condenser run through its charging process without any light impinging upon photo-electric cell 20. By manipulating rheostat 105, the charging time can then be adjusted to a definite and predetermined value. This charging time, however, is considerably longer than one of the three charging periods used for light measuring purposes described above, and we could not test the leakage condition of the device in this manner because the charging process would be interrupted by the action of rotating switch 161. We are, therefore, connecting contacts 164 and 166 and inserting in the wire which connects these two contacts to the positive terminal of condenser 92 a three-position rotating switch consisting of a rotating contact 170 and two segments 171 and 172. As long as the rotating contact 170 rests on the segment 171, the action of rotating switch 161 is unimpaired, i. e., the condenser 92 is periodically short circuited by the charging periods. When, however, contact 170 is placed on contact 172, the connection is interrupted and the two contact pairs 164 and 165, and 166 and 167 no longer short circuit condenser 92. In this case, the charging process progresses uninterrupted until condenser 92 is charged sufficiently to actuate by thyratron 106 the two relays and thereby terminates the rotation of motor 145.

*Mechanical design of light intensity indicator*

The light intensity indicator is mounted within housing 51. This housing is supported in the manner shown in Figs. 2 and 3 within the larger housing 52 and can be laterally shifted with respect to the same, for example, by a hand wheel 59 and lead screw 180. This lead screw is rotatably supported within housing 52 and engages a threaded boss 181 attached to housing 51, see Fig. 4.

The most essential mechanical element of the light intensity indicator is the motor 145. This motor must be of the constant speed type and is preferably a small synchronous motor commercially available for clock works or the like. These motors are available with built-in gear reductions of suitable ratios and with a magnetic gear shift which automatically engages the output shaft and causes it to rotate as soon as the motor is energized. As soon as the motor is deenergized the gear shift disengages the output shaft which is then, usually driven by a spring, free to return to its starting position.

The following elements are mounted on the output shaft of motor 145: A cam 185, the configuration of which will be described later; the two rotating switch elements 146 and 160 which were shown in Fig. 13 and whose function was explained in the preceding paragraph, the sliding contacts cooperating with these elements have, in the interest of simplicity, not been shown in Figs. 2, 3 and 4; a ratchet gear 200 which is part of the resetting device; a coil spring 187 shown cross sectionally in Fig. 4, this spring serving the purpose of returning the output shaft of the motor with all elements mounted thereon as soon as the motor is deenergized; a pointer 201 which is mounted on the rearward extension of the motor shaft, this pointer being used in connection with the zero test and appearing in window 66 when condenser 92 is charged solely by the current circulating in the second charging circuit.

Figure 4:
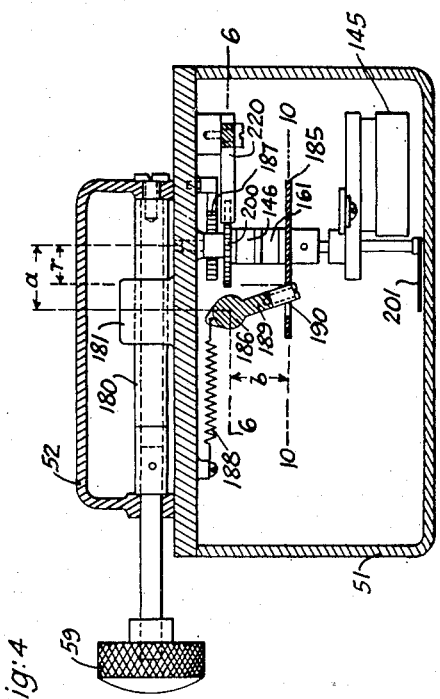
Fig. 4 is a horizontal sectional view along the plane of line 4—4 in Fig. 2.

The cam following element 186 is shown in cross section in Fig. 4 and its front view can be seen in Fig. 2. It is a substantially cylindrical body supported on both ends by pivots. It is biased by a spring 188 which tends to turn it in a counter-clockwise direction, Fig. 4, and carries a protruding boss 189 with a cam following roller 190 in operative contact with cam 185.

Figure 5:
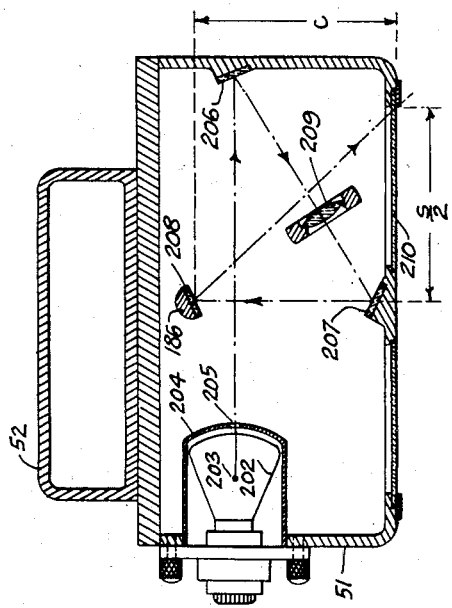
Fig. 5 is a horizontal sectional view along the plane of line 5—5 in Fig. 2.

It is necessary to have a pointer or its equivalent operated by the cam following element 186, and this pointer is to indicate on a light intensity scale, calibrated in foot candles or the like, light intensity values. A mechanical pointer of suitable length could conceivably be used, but we prefer to use a beam of light which is deflected by a small mirror attached to the cam following element 186. The optical system for this purpose is shown in Fig. 5 which is a cross section substantially in the plane of line 5—5 of Fig. 2. A small incandescent lamp 202 has a straight filament 203. The lamp is preferably of the low voltage type and certain types available for sound pictures serve this purpose quite well. The lamp is so mounted that the straight filament is vertical, see Fig. 2, and it consequently appears in the cross section view of Fig. 5 as a point. The lamp is mounted within a cylindrical light shield 204 having an elongated narrow slot 205 on its front face. The light of the filament passes this slot 205 and is reflected by two stationary reflectors 206 and 207 onto a rotatable reflector 208 attached to the cam following element 186. Reflector 208 reflects the light beam on a ground glass 210 which preferably carries the light intensity scale 53 as shown in Fig. 1. A light collecting lens 209 is mounted between reflectors 206 and 207, and its focal length is so chosen that it projects a sharp image of the straight filament 203 on the ground glass 210. As can be seen in Fig. 3, reflector 207 is slightly forwardly inclined so that the light beam between 207 and 208 has a slight downward inclination. The result is that the beam between 208 and the ground glass 210 is disposed in a somewhat lower plane than the other elements, thereby avoiding interference. In the position shown in Fig. 5, the cam following element 186 with the mirror 208 reflects the light beam into the extreme right corner of the ground glass 210 or, in other words, of scale 53 on Fig. 1. The projected image of the filament 203 would appear as a bright line at the extreme right end of the scale at the value of 10 foot candles. As soon as the motor 145 with the cam 185 begins to rotate, cam following element 186 with mirror 208 will change its position and reflect the light beam progressively more towards the left, covering all values from 10 to .01 foot candles on the scale 53 shown in Fig. 1.

Figure 7:
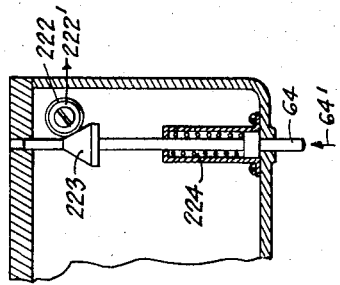
Fig. 7 is a sectional view along the plane of line 7—7 in Fig. 6.
Figure 6:
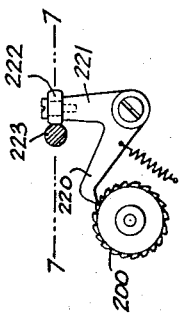
Fig. 6 is a detail of a resetting device.

It has been explained before that upon a momentary depression of push button 144 motor 145 starts to rotate. This initiates the charging process of condenser 92, which continues until the condenser voltage has been built up to a pre-determined value, whereupon, by action of thyratron 106 and the two relays, motor 145 is made to stop. Means must be provided to maintain the motor shaft in the extreme position thus reached against the force of the coil spring 187 which tends to return the motor shaft with all elements mounted thereon into its original starting position. These means are shown in Fig. 6 and comprise a ratchet wheel 200 mounted on the motor shaft and a pivoted pawl which has one end 220 engaging ratchet wheel 200 and another end 221 carrying a small roller 222. It will be obvious from Fig. 6 that the ratchet wheel 200 is able to rotate in a counter-clockwise direction when driven by the output shaft of motor 145 but that, when the rotation of this shaft ceases, gear 200 and therewith all other elements mounted on the motor shaft will be arrested in their extreme position. The result is that the reflected image of filament 203 which serves as a pointer comes to rest at some point of the scale 53 of Fig. 1, thereby indicating the foot candle value which corresponds to the measured charging time of condenser 92. The light intensity indicating light beam can be returned to its starting position by releasing ratchet wheel 200, which in turn can be done by rotating slightly the pivoted pawl. The "off" push button 64, visible in Fig. 1, is provided for this purpose and its action can be seen in Fig. 7. This push button is slidingly supported in housing 51. It carries a tapered part 223 and is biased by a cylindrical spring 224. As soon as the operator depresses push button 64 in the direction of arrow 64', roller 222 moves to the right as indicated by an arrow 222'. The result is a rotary motion of the pawl so that element 220 looses contact with the teeth of the ratchet wheel 200, whereupon under the influence of spring 187, the entire output shaft assembly including cam 185 of motor 145 returns to its starting position. This, in turn, causes cam following element 186 with mirror 208 to return to their respective starting positions.

The scale upon which the filament 203 of lamp 202 is projected can be seen in Fig. 1. It is calibrated in foot candles and its divisions are logarithmically spaced. It is assumed that this scale covers a range from .01 to 10 foot candles and the largest values are on the right and the smallest values on the left end of this scale. Immediately below this scale, a groove 230 is milled in the front wall of housing 51. A number of movable tabs 231 are provided which are capable of sliding within this groove. It is the purpose of these tabs to be set by the operator manually at points below the measured intensity values indicated by the projected filament on scale 53, i. e., below those points where for a selected point of the image on the easel the bright line comes to a rest after the charge of condenser 92 terminates the movement of motor 145. Since it is usually desirable to measure several points on the easel, these tabs enable the operator to keep a simultaneous record of several light intensities, or retain several measurements simultaneously for ready reference.

*Cam design*

In a previous chapter the relation between logarithmic light intensity and condenser charging time was established as follows:

$$\log L = \log \frac{i_2}{K} + \log \left(\frac{1}{\frac{T}{T_0}} - 1\right)$$

From this formula it can be seen that for $$\frac{T}{T_0} = 0$$

log L becomes infinite, and for $$\frac{T}{T_0} = 1$$

log L becomes negatively infinite. Consequently only certain parts of this curve can be used which do not approach either $$\frac{T}{T_0} = 0, \quad \text{or} \quad \frac{T}{T_0} = 1$$

too closely. The precise limits are a matter of judgment, and in the example shown, we have chosen to start with $$\frac{T}{T_0} = .1$$

and utilize the curve up to $$\frac{T}{T_0} = .526$$

It can be easily computed that then the difference of the two corresponding log L values is 1, or that we are covering one decade of light values.

$$\frac{T}{T_0}$$

is directly proportional to the angle $\varphi$ of the motor ouput shaft, and we have chosen to make this angle 200° for $$\frac{T}{T_0} = 1$$

It is preferable not to begin the condenser charging times simultaneously with the rotation of motor 145, but to allow a brief period of time for the motor to be accelerated before removing the short circuit of condenser 92 so that the charging period can begin. This has the advantage that any play in the train of gears and any uncertainty in the gear shift will not influence the measured charging time. Consequently the rotating switch element 161 has been so disposed with respect to the output shaft of motor 145 that the motor can rotate 5° before opening the short circuit of condenser 92.

Therefore, with the 5° starting allowance for the motor and with the limits of $$\frac{T}{T_0} = .1 \quad \text{and} \quad \frac{T}{T_0} = .526$$

the mechanism of the time measuring device works as follows: As soon as the operator depresses temporarily push button 164, motor 145 begins to rotate. After 5°, the short circuit of condenser 92 is removed and the charging period begins. The cam rotated by the motor has at first a constant radius and, therefore, does not move the light indicating pointer for 20°. From then on, the light beam which serves as a pointer will be progressively deflected until $$\frac{T}{T_0} \text{ becomes } .526$$

A value of .526 corresponds to an angle of 105°, to which the 5° for the starting period must be added so that at an angle of 110° the cam ceases to deflect the ray of light further, i. e., from then on it again has a constant radius. This part with the constant radius should theoretically extend until $$\frac{T}{T_0} = 1$$

or $\varphi = 205°$, but manifestly since the light intensity indicator is stationary during this period this would be a waste of operating time, and this period, therefore, can be arbitrarily shortened. In the example shown, it has been shortened to 15°.

Within the operating cycle as described up to this point the device is capable of measuring light intensities within a range of one decade. However, as has been explained above, it is necessary to extend this range to several decades and, therefore, at the end of this period the two rotating switch elements 160 and 146, Fig. 13, automatically discharge condenser 92 and change the aperture in front of the photocell. The cycle then begins again and this can be repeated several times; three times in the example shown.

Figure 8:
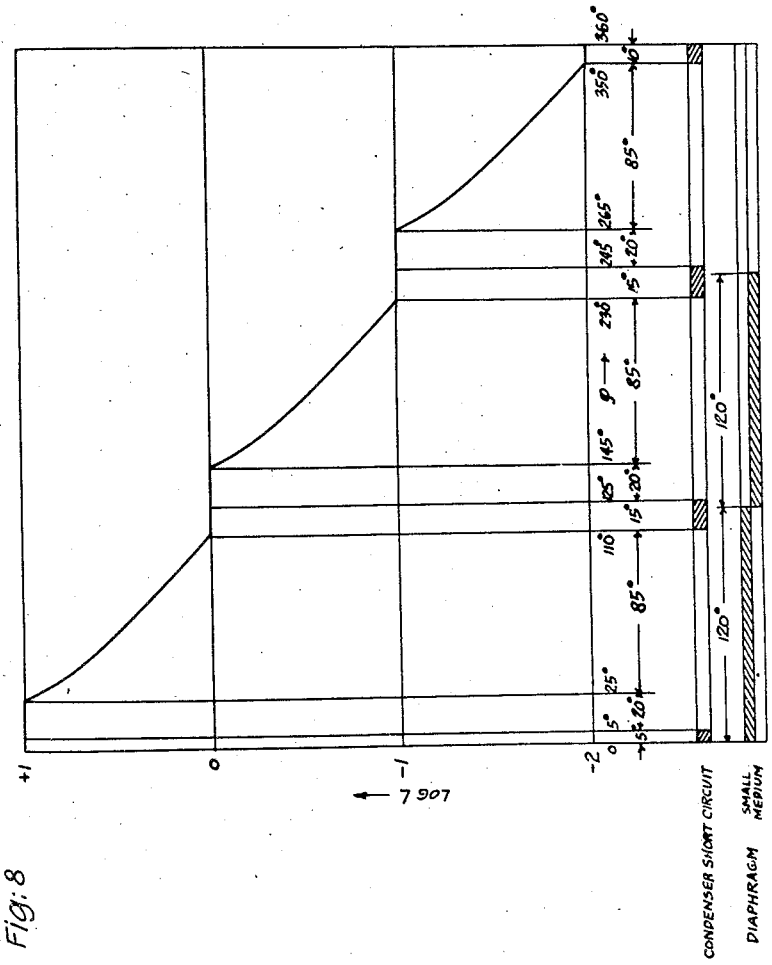
Fig. 8 is a graph showing the relation of the logarithmic light intensity value and the angle of rotation of a cam which is part of the light intensity indicator.

This relation between log L and $\varphi$ is shown in Fig. 8. In the interest of clarity, we have also shown schematically the period during which the condenser is short circuited, and we have also indicated which of the diaphragm openings are placed in front of the photocell.

Figure 10:
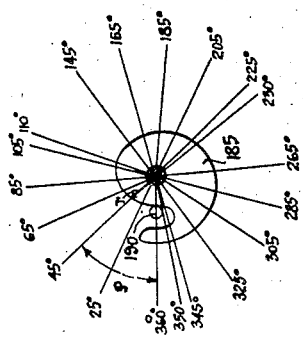
Fig. 10 shows the shape of said cam.
Figure 9:
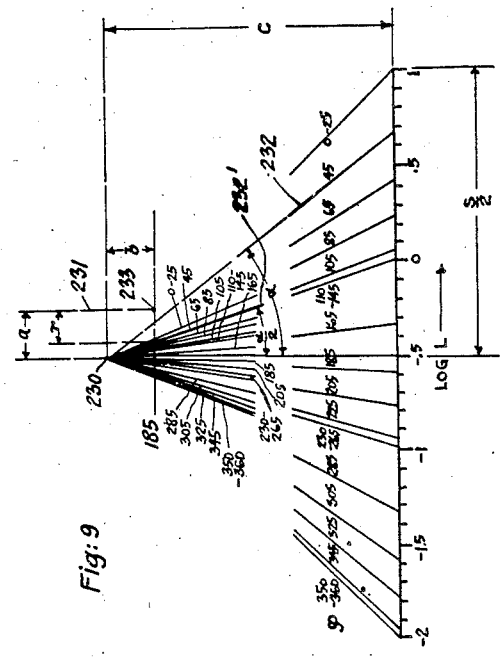
Fig. 9 is a geometric construction by means of which the configuration of said cam can be determined.

The construction of the cam itself can be seen in Figs. 9 and 10. Referring to Fig. 9, we have shown a scale of log L, the length of which we have called S. Above the center of this scale at a distance c, we have the point 230 which is the pivot point of the cam following element 186. At a horizontal distance a from this point, we have a line 231 which is the center line of the output shaft of motor 145. The cam itself is schematically shown in Fig. 9 by a line 185 which is disposed at a vertical distance b from 230.

The cam can be constructed as follows: A system of lines is drawn connecting selected points of the lag L scale with point 230. These lines correspond to selected values of φ and the relation between log L and φ is taken from the graph in Fig. 8. In the interest of clarity, we have marked the corersponding φ values on these lines. Each of these lines forms an angle α with the line connecting point 230 to the center of the log L scale.

A second system of lines is now constructed and each of these new lines forms an angle of $$\frac{\alpha}{2}$$

with the line connecting 230 and the center of the log L scale. This is shown in Fig. 9 for φ=45°, i. e., line 232' forms half the angle with the center line as line 232. This is done symmetrically for all lines.

The theoretical reason for this procedure will be clear by contemplating the path of the ray of light which serves as a pointer as illustrated in Fig. 5, which shows that a rotation of mirror 208 by a given angle will cause a rotation of the reflected beam of light by twice this angle.

The point of intersection of lines 231 and 185 is called 233, and on line 185, each of the lines of the second system determines a distance r which is again shown as an example for φ=45. This dimension r is the radius of the cam for the corresponding angle φ and the configuration of the cam in a system of polar coordinates can consequently be determined accordingly, see Fig. 10. In the interest of clarity, portions with a constant radius have been shaded in this figure, and it can, therefore, be seen that the radius of this cam is constant between 0° and 25°, between 110° and 145°, between 200° and 265°, and between 350° and 360°, i. e., the configuration of this cam conforms to the graph shown in Fig. 8 when allowance is made for the fact that the deflection angles have to be halved due to the action of mirror 208.

*Stepwedge unit*

This unit can be seen in Figs. 2 and 3. It consists essentially of a movable support carrying a number of stepwedge prints, i. e., prints containing in systematic arrangement numerous small and usually rectangular areas which were exposed to different light intensity × second values. While the support and the method of moving it may follow any conceivable design, we have chosen a rotatable cylinder as one of the simplest constructions.

Figure 14:
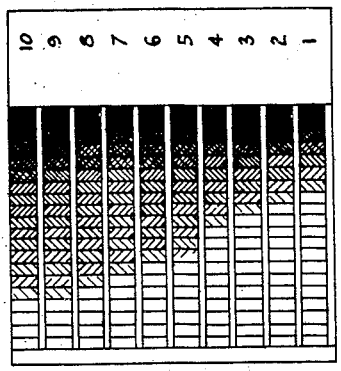
Fig. 14 is a diagrammatic representation of a typical family of stepwedge prints used in the predicting device.

A shaft 240 is supported by bearings 241 and 242, and may be rotated by means of the hand wheel 60. The two bearings are, preferably, contained in a separate unit 243 fastened to housing 52 by means of two knurled screws or the like, so that it can be easily detached. The shaft 240 carries on its left side a cylindrical drum 244 on which the stepwedge prints can be fastened. Spring clips or similar means must be provided for this purpose, but since these means are well known in the art, none have been shown on the drawing. To the left side of drum 244, two rotary switches are visible which are needed only if the device is equipped with the contrast control to be described later. A typical example of a family of stepwedge prints which may be fastened on drum 244 is shown in Fig. 14. As can be seen in Fig. 3, the cylindrical part 244 is so disposed within housing 52 that one of the stepwedge prints becomes visible through the elongated window 54 which can also be seen in Fig. 1.

Referring to Fig. 1, it can be observed that a foot candle × second scale 55, ranging in this example from .1 to 100 foot candle × seconds, is arranged on the front face of the lower part of housing 52. A system of lines 58 is provided which are arranged in such a manner that each area of the stepwedge print visible in window 54 is connected to that foot candle × second value on scale 55 to which it was exposed. This system of lines forms, therefore, means to coordinate the individual areas of the stepwedge print and the foot candle × second values on scale 55.

In order to show on which grade of paper the stepwedge print has been made, suitable characters may be inscribed opposite the various stepwedge prints, and one of these characters is rendered visible by means of an additional small window 255, see Fig. 1.

*Time switch*

The foot candle scale 52 and the foot candle × second scale 55 are affixed, respectively, to housings 51 and 52, and are, together with these housings, movable relative to each other and form a slide rule-like computing mechanism. Therefore, the shift of housing 51 relative to housing 52 corresponds to the logarithmic difference between a foot candle × second value and a foot candle value, or in other words it can be represented by a time value. This is the basis for the arrangement shown in Fig. 1 which shows a mark 57 affixed to housing 52 and indicating time values on a time scale 56 affixed to the upper half of housing 52. These time values are, of course, again logarithmically spaced and it is consequently desirable to design the automatic time switch in such a manner that it cooperates with the least amount of mechanism with this straight and logarithmically spaced time scale.

The time switch may be contained either within housing 51 or within housing 52. In the example shown, we have chosen to mount this time switch in the upper part of housing 52. The time adjusting mechanism, however, must in any case, be operatively connected to the mechanism by which housing 51 is shifted relative to housing 52, so that the time of a subsequent exposure will always be indicated by mark 57 on scale 56.

The time switch, designed accordingly, can be seen in Figs. 2 and 3. It is driven by a motor 250 fastened to the upper part of housing 52 and which is again preferably of the synchronous type used for clock works, again equipped either with an electro-magnetic clutch or, preferably, with a gear shift arrangement so that the output shaft starts rotating the instance the motor is energized, but is automatically disengaged and free to return to its starting position when the motor is deenergized.

This motor drives a shaft 251 which is of a square or similar cross section. Mounted on this shaft is a cam 252 with a hub 253. The hub 253 has a square hole so that the cam is forced to rotate with shaft 251, but can slide axially on it. The hub 253 has a circular groove which is engaged by a fork-like element 254 fixedly attached to the housing 51 slidably supported within the housing 52. In this manner a movement of housing 51 relative to housing 52 will shift cam 252 axially on square shaft 251, thereby automatically adjusting the exposure time to the value indicated by mark 57 on scale 56.

A pivoted lever 256 with its pivot point 257 is mounted above shaft 251. It carries a long cylindrical roller 258 in contact with cam 252. Usually gravity is sufficient to insure this contact, but if necessary additional bias may be provided by a spring. A projection 259 is carried by lever 256 on its extreme right end. Due to the rotation of cam 252, lever 256 describes an arc and the velocity of this movement depends upon the position of cam 252, i. e., the farther left cam 252 is shifted, the faster the movement of lever 256 around pivot 257 takes place, i. e., the exposure time gets shorter. After lever 256 has travelled a small angle, 15° in the example shown, projection 259 comes in contact with spring 260 which forms part of and actuates switch 261. This switch is, at this time closed and is of the maintained contact type, i.e., it is opened by the pressure of projection 259 upon leaf spring 260 and remains open even after this pressure has ceased. The closed condition can be restored by depressing push button 61, and this push button is used to initiate an exposure. Referring to Fig. 13, it can be seen that motor 250 is connected to the line across switch 261. This switch is usually open as the result of a previous exposure and is, at the beginning of an exposure, closed by the operator depressing push button 61. As soon as this takes place, the shaft of motor 250 begins to rotate driving cam 252 and thereby swivels lever 256 until the projection 259 comes to a contact with the leaf spring 260 of the switch 261, thereby opening the motor circuit, which now remains open until the operator depresses button 61 again for the next exposure. It has already been explained that the time required for this movement depends upon the position of cam 252 and that, when cam 252 is shifted towards the left, the exposure times become short and, when it is shifted towards the right, the exposure times become long. The lamp of the enlarger is connected in parallel to the motor and is, therefore, switched on and off at the same time.

In order that the divisions of the time scale 56 be spaced logarithmically, the configuration of cam 252 must be properly designed or, more specifically, in a system of polar coordinates the radius must increase in linear proportion to the logarithmic value of the angle.

Method of operation

The device is usually operated in the following sequence: First, the zero point is checked and, if necessary, adjusted; second, the light intensity at a number of selected points on the easel is measured; third, by means of hand wheels 59 and 60, the density predictions for the selected points of the easel are adjusted; and fourth, a timed exposure is made, the timer having been adjusted automatically during the previous step.

For the zero point adjustment, the aperture in the photocell housing 122 is covered, so that no light can impinge upon photocell 20. The hand wheel 62 is put in the "zero test" position and push button 144 is depressed. Referring to Fig. 13, the depression of push button 144 energizes relay 141 and starts a rotation of motor 145. Condenser 92 is at the beginning of the operation short circuited by normally closed contact 143 and by contact strip 161 connecting sliding contacts 162 and 163. As soon as relay coil 141 is energized contact 143 opens. Contacts 162 and 163 are still connected, but this connection is interrupted after motor 145 has rotated 5° whereupon condenser 92 is beginning to accumulate a charge. Due to the fact that no light impinges upon photocell 20, this charge originates entirely from the second charging circuit or from accidental leakage. It can be seen that when the three-position switch is placed into the "zero test" position, i. e., when contact 170 rests on the unconnected segment 172, the contact pairs 164, 165 and 166, 167 of the rotating switch 160 are rendered ineffective. Consequently the charging process of condenser 92 proceeds uninterruptedly until this condenser by the action of the second charging circuit and possibly by some accidental leakage has accumulated a certain voltage. As soon as this takes place, thyratron 106, which up to this point did not conduct current is rendered conductive, actuates relay coil 111 and thereby opens the normally closed contact 112 deenergizing motor 145.

A thyratron usually does not conduct current as long as it is more than −2 volts negative with respect to its cathode. It can be seen that the negative voltage of grid 108 with respect to the cathode 107 equals the voltage impressed upon the left half of resistance 114 minus the voltage of condenser 92 since these two elements are of opposite polarity. At the beginning of the charging period, the condenser voltage charge is zero, but after a certain time it will approach the voltage of the left half of resistance 114 within two volts and then the thyratron will begin to conduct current, thereby stopping, in the manner described above, the rotation of motor 145.

As can be seen in Fig. 4, the rearward extension of the output shaft of motor 145 carries a pointer 201. This pointer will at the end of the charging period become visible within window 66 and, if the second charging circuit is adjusted properly, pointer 201 will come to a standstill in the center of window 66. For convenience this center is marked by a line. If the position of pointer 201 falls short of this line, or if the pointer overshoots this line, the current circulating within the second charging circuit must be adjusted. In the example shown in Fig. 13, this can be done by means of resistance 105, hand wheel 65, which increases or decreases the light emitted by lamp 104. This, in turn, causes photocell 103 to pass more or less current. After this adjustment, it may be necessary to test the zero point again until a satisfactory condition is established, and pointer 201 comes to a standstill in the middle of window 66. After each test, the device can be reset by depressing push button 144 which, by means of the mechanism shown in Figs. 6 and 7, releases the ratchet 200 by which the output shaft of motor 145 was arrested in its extreme forward position. The device is now ready for the measuring process.

For this purpose the three-position switch is placed in the "measuring" position in which it is shown in Fig. 13, i. e., contact 170 rests on segment 171. A negative is placed into the enlarger and the light within the enlarger housing is switched on. This device as contemplated now is as yet not equipped with a contrast control device, and, therefore, the lamphousing shown in Fig. 1 is not needed, but is assumed to have been replaced by a conventional lamphousing comprising one single lamp substantially in the place now occupied by lamp 131. In other words, lamp 32 and elements 33, 34 and 35, may be assumed to be absent. Photocell housing 122 is placed on the easel in such a way that a selected point of the image falls within its aperture. The operator then depresses push button 144 which again, in a similar manner as described above, initiates a charging period of condenser 92, Fig. 13. The difference, however, is that now due to the different position of the three-position switch, rotatable contact 170 rests on segment 171 and thereby renders contact pairs 164, 165 and 166, 167 effective so that they also can short circuit condenser 92.

The multiple charging cycle can best be understood by contemplating the diagram of Fig. 8, and is described step by step below. In this description it is assumed that a selected point on the easel with a very low light intensity is being measured.

$\varphi = 0°$.—Operator depresses momentarily push button 144, energizes relay coil 141, closes contact 142. Motor 145 begins to rotate. Contact 143 is opened, but condenser 92 is still shortened by contacts 162, 163 and rotating switch 160. Rotating switch 146 and contacts 150, 151 energize solenoid 136, placing smallest aperture 130 in front of photocell 20.

$\varphi = 5°$.—Rotating switch 160 opens, condenser 92 begins to accumulate a charge, first charging cycle. The portion of cam 185 in contact with cam following element 186 has a constant radius; indicating light beam on scale 53 therefore remains stationary at extreme right end, 10 foot-candle value.

$\varphi = 25°$.—Radius of cam 185 begins to increase; indicating light beam is deflected and begins to move towards the left on scale 53. Since the intensity of the light impinging upon photocell 20 is assumed to be small, condenser 92 accumulates a charge at a slow rate and its voltage, during the first charging cycle, does not become high enough to reduce the negative bias of thyratron grid 108 with respect to its cathode 107 sufficiently to render thyratron 106 conductive. Motor 145, therefore, continues to rotate.

$\varphi = 110°$.—Indicating light beam has reached end of first decade, 1 foot-candle value. Radius of cam 185 remains constant between $\varphi = 110°$ and $\varphi = 125°$, keeping indicating light beam stationary. Condenser charging process is terminated by rotating switch 160, contacts 164, 165, which short circuit condenser 92. Rotation of switch 146, between $\varphi = 110°$ and 125°, deenergizes solenoid 136, contacts 150, 151, and energizes solenoid 135, contacts 152, 153, placing next larger aperture 129 in front of photocell 20 for second charging cycle.

$\varphi = 125°$.—Rotating switch 160, contacts 164, 165 opens; second charging cycle of condenser 92 begins. Radius of cam 185 remains constant until $\varphi$ becomes 145°, therefore light beam on scale 53 remains stationary at the 1 foot-candle value.

$\varphi = 145°$.—Radius of cam 185 begins to increase again, making light beam on scale 53 resume its leftward travel. Condenser 92 accumulates a charge at a faster rate during the second charging cycle than during the first cycle, because aperture 129 admits more light than aperture 130. We shall assume, however, that the light intensity is so low, that even during the second cycle thyratron 186 is not rendered current conductive, so that motor 145 continues to rotate.

$\varphi = 230°$.—Second charging cycle of condenser 92 is terminated by action of rotating switch 160, contacts 166, 167, which short circuits condenser 92 again. Light beam has passed through second decade of foot candle values on scale 53 and remains stationary at .1 foot-candle value, because radius of cam 185, between $\varphi = 230°$ and $\varphi = 265°$ is constant. Rotating switch 146, between $\varphi = 230°$ and $\varphi = 245°$, renders both solenoids 135 and 136 currentless, so that sensitivity of photocell 20 is now governed by largest aperture 125, fixed in photocell housing, see Fig. 12.

$\varphi = 245°$.—Rotating switch 160, contacts 166, 167, opens condenser short circuit, and third charging cycle begins. Light beam remains stationary on .1 foot-candle value since radius of cam 185 is constant until $\varphi$ becomes 265°.

$\varphi = 265°$.—Radius of cam 185 begins to increase again, moving light beam on scale 53 leftwards. Condenser 92 accumulates a charge now at a relatively rapid rate, since aperture 125 is large and admits relatively much light. Eventually the condenser voltage becomes so high that the bias of grid 108 relative to cathode 107 becomes less than —2 volts. Thereupon thyratron 106 begins to conduct current, energizes relay coil 111 and opens contact 112, causing motor 145 to cease rotating. Action of ratchet wheel 200 and pawl 220 arrests motor shaft at extreme forward position, until released when operator depresses "off" button 64, Fig. 7.

In other words, at the end of the measuring process, the light beam comes to a standstill at some point of scale 53, and for the chosen example of a low measured light intensity this point will be far to the left somewhere between the .1 and .01 foot-candle values.

In the above example a very low light intensity was assumed so that in the above description the light measuring process would run through all three cycles. In reality, the light intensity will very frequently be higher and it will be clear that then condenser 92 will accumulate a charge sufficiently rapid to stop, in the described manner, the rotation of motor 145 during the second cycle, or in case of very high light intensities during the first cycle. In this case, the light intensity indicating beam will come to rest within the second or first decade of scale 53, respectively.

It is necessary to measure in the manner described the light intensity of at least the brightest and darkest point of the easel on the image, but very often it is also desirable to measure the light intensity of other points whose appearance may be considered important for the finished print. In order to make it unnecessary for the operator to memorize the various measured light intensity values, a number of slidable tabs, for example 231, 231' and 231" are arranged below scale 53. These tabs are moved manually by the operator to points below the respective places where the light beam on scale 53 comes to a standstill. After the measurements have been completed, these tabs stay in their respective positions and retain the measured light intensity values of the various points for ready reference.

These tabs indicate not only foot-candle values on scale 53, but also foot-candle × second values on the adjacent scale 55. These foot-candle × second values, however, depend not merely upon the measured light intensities of the various points, but also upon the relative positions of housings 51 and 52. In other words the foot-candle × second values indicated by the various tabs on scale 55 equal the foot-candle values indicated on scale 53 multiplied by the time value indicated by mark 57 on scale 56. Any foot-candle × second value can be translated into a density prediction by tracing this value from scale 55 through one of the lines 58 to one of the areas of the stepwedge print visible in window 54. This area was exposed on the same grade of paper to the same number of foot-candle × seconds and shows, therefore, the same density with which a selected point on the easel will be reproduced by an exposure time as indicated on scale 56 on the grade of paper on which the stepwedge print visible in window 54 was made.

It is usually desirable to make full use of the contrast range of the available photographic paper or, in other words, the brightest point on the easel should be reproduced as a substantially black tone and the darkest point on the easel should be reproduced with a substantially white tone. Certain precautions, however, are necessary in this respect because due to the well known S shaped characteristic of all photographic papers, small density differences on either end of the scale will not be reproduced. Therefore, it is really better to have the brightest point of the easel reproduced not as a full black, but as a rather dark gray and, likewise, the darkest point of the easel be better reproduced not as a plain white, but rather as a light gray.

Referring to the example shown in Fig. 1, it can be seen that tabs 231, 231′ and 231″ indicate on scale 53, respectively, values of .20, .70 and 1.50 foot-candles. The timer has been adjusted to 20 seconds and consequently the foot-candle × second values indicated by the three tabs on scale 55 are 4.0, 14 and 30 foot-candle seconds.

It can be seen that the 4.0 foot-candle × second value indicated by tab 231 can be traced by the sixth line from the left of system 58 to area 300 of the stepwedge print. Tab 231 is assumed to represent the light intensity of the darkest point of the easel and area 300 should, for best results, be the first area of the stepwedge prints which departs slightly from the complete white of the area adjacent to the left, i. e., it should be very slightly gray.

Tab 231″ is supposed to represent the light intensity of the brightest point on the easel. In the position shown, it indicates on scale 55 a value of 30 foot-candle seconds. This value can be traced by the fifth line from the right of system 58 to area 301 of the stepwedge print. For best results this area should be the first which departs slightly from the complete black color of the area adjacent to the right, i. e., it should show a very dark gray rather than a complete black.

In the example shown the instrument is, therefore, properly adjusted for an exposure and the contrast range of the negative is matched with the available contrast range of the photographic paper. Ordinarily such a condition would rarely present itself to the operator at his first attempt and it will usually be necessary to adjust either hand wheel 59 or hand wheel 60, or usually both.

It is, for example, possible that the horizontal distance between tabs 231 and 231″ is equal to the horizontal distance between the first light gray area 300 of the stepwedge print and the first dark gray area 301 of the stepwedge print, but that 231 can be traced to an area of the stepwedge print which lies to the right of area 300, and that likewise 231″ can be traced to an area which lies to the right of area 301. This would mean that by a subsequent exposure both prints would be rendered too dark, or the entire print would be over-exposed. This condition can be remedied by rotating hand wheel 59, thereby shifting housing 51 towards the left, until the lines of system 58 connect tabs 231 with area 300 and 231″ with area 301, respectively. This obviously would change simultaneously the exposure time of a subsequent exposure by shifting, Fig. 2, fork-like element 254 and therewith cam 252 of the time switch. The new exposure time would be indicated by the changed position of mark 57 relative to scale 56.

On the other hand, it is possible that the instrument as adjusted at the beginning of the operation indicates an under-exposure, i. e., tab 231 would be traceable to an area to the left of 300 and tab 231″ would be traceable to an area to the left of 301. In this case housing 51 must be shifted to the right, thereby adjusting the timer to a longer exposure time.

Very often it will be found that the horizontal distance between tabs 231 and 231″ which represent the density difference or contrast between the darkest and brightest point of the easel, respectively, will be longer or shorter than the horizontal distance between areas 300 and 301 of the stepwedge print which is visible in window 54. This distance betwen 300 and 301 represents the available contrast range of the photographic paper on which this particular stepwedge print was made. The fact that the distances between 231 and 231″ and between 300 and 301 are not the same indicates that the contrast range of the image is either larger or smaller than the available contrast range of the photographic paper, or in other words, a perfect print of this particular negative cannot be made on this particular paper. The only remedy then is to use some other paper and to bring consequently a stepwedge print made on another grade of paper with either a larger or smaller contrast range into view by rotating the cylindrical support 244 of the stepwedge unit by means of hand wheel 60. For best results a paper should always be chosen which has approximately a contrast range, i. e., a distance between the first light gray area 300 and the first dark gray area 301, which matches the contrast range between the darkest and brightest point on the easel. As soon as a paper grade has been found that has this property, it is possible to adjust the instrument to the condition shown in Fig. 1. In other words, if the contrast ranges of paper and image match, it may still be necessary to adjust the exposure time so that the predicted density of the brightest point on the easel is represented by the first dark gray area of the stepwedge print and that the predicted density of the darkest point of the easel is represented by the first light gray area on the stepwedge print. After this condition is achieved the instrument is now ready for an exposure.

The three step switch actuated by hand wheel 62 is placed on "exposure," the photocell housing 122 is removed from the easel and a sheet of sensitive paper is placed thereon. This sheet must, of course, be of the same grade as the one on which the stepwedge print was made that appeared in window 54 during the final adjustment. It has already been explained that the shift of housing 51 relative to housing 52 automatically adjusted the time switch by shifting cam 252. The operator now initiates an exposure by depressing push button 61 which, Fig. 13, closes the circuit of motor 250 and of the lamp in the enlarger which is connected parallel to said motor. Since this switch is of the maintained contact type, it remains closed even after the operator ceases to depress button 61. After the elapse of a certain time, depending upon the relative position of cam 252, the projection 259 of the rotatable lever 256 will make contact with the leaf spring 260 of switch 261, thereby switching it off, bringing motor 250 to a standstill and turning off the lamp of the enlarger.

Contrast control

It has been explained in the preceding paragraph that the contrast range of the image and the available contrast range of the photographic paper should be the same. In practice this is not always possible, since bromied paper is usually available in 3 or 4 contrast grades only, and, therefore, the contrast of the picture may really call for a paper of contrast range somewhere between two actually available grades. Still worse, small errors in measurement, which would be negligible if corresponding papers were available, may have the result of causing the operator to select a paper which is one entire contrast grade different from what it really should be, and this discrepancy will no longer be negligible.

This situation can be very materially improved by using a variable contrast paper which is now commercially available. This paper is capable of yielding prints of any desired degree of contrast, depending upon the color mixture of the light to which it is exposed. More specifically, with blue light, very constrasty and, with yellow light, very soft prints are obtained and intermediate contrast ranges are available by using corresponding blue-yellow mixtures.

The desired color mixture can be obtained by two different methods. In the first method two subsequent exposures are given with blue and yellow light, respectively, and the contrast of the finished print depends upon the relative percentage of both exposure times. With the second method two adjustable sources of light of blue and yellow color, respectively, are used simultaneously together with means to superimpose the two colored light beams upon each other. In the present example we have chosen to use the second method.

The color control device, therefore, consists of two parts, the illuminating sytem of the enlarger and the control device. The illuminating system of the enlarger is shown in Fig. 1. It comprises two lamps 31 and 32 emitting substantially white light, color filters of different colors 33 and 34 in front of the respective lamps and an element 35 by means of which the two colored light beams are superimposed upon each other. This last element is most commonly a half transparent reflector capable of transmitting part of the light coming from lamp 31 and reflecting part of the light coming from lamp 32. Half transparent reflectors, however, have a rather low optical efficiency, since they absorb a great deal of light. Better devices have been developed lately which are called dichroic reflectors and which consist of a sheet of transparent material, usually glass, coated on one or both sides with a number of thin transparent films. These films may be made from a variety of materials, for example, cryolite, zinc sulfide, or thorium oxi-fluoride. Interferences occur between the incoming and reflected light beams and, by choosing the transparent film of a proper thickness and from a suitable material, an incoming beam can be split in such a way that it is partly reflected and partly transmitted. The optical efficiency of dichroic reflectors is considerably better than that of half transparent mirrors.

Dichroic reflectors are of two different types. In the first type, the reflected as well as the transmitted beam consist both of white light, and the advantage of the dichroic reflector is merely the avoidance of the light loss charactersitic of half transparent mirrors. The color filters 33 and 34 are in this case present, as shown in Fig. 1. In the second type the incoming light beam is split in such a way that part, for example the blue portion, of the spectrum is reflected and the rest of the spectrum, for example yellow, transmitted. A dichroic reflector of this type, therefore, serves as a combination color filter and light mixing device, and color filters 33 and 34, in this instance can be dispensed with. For example, the blue rays of lamp 32 may be reflected by element 35, and the yellow rays of lamp 31 may be transmitted.

The two colored light quantities emitted by lamps 31 and 32 must be controlled in such a way that the relative share contributed by one lamp increases while the relative share contributed by the other lamp decreases, the sum of both shares remaining constant. This can be done in a variety of ways by purely mechanical as well as by electrical means. We have chosen to control the lamps by means of two rheostats which are schematically shown in the right side of the wiring diagram of Fig. 13. These rheostats comprise two tapped resistance elements 311 and 312. The taps are connected to a number of circularly arranged switch buttons, one of which, of each switch, is in conductive contact with a rotating contact blade 313 and 314, respectively. These contact blades 313 and 314 are mounted in tandem on a common shaft. It can be seen that they both have the same polarity so that they do not have to be insulated from each other. In the example shown each step switch has 10 steps.

In order to meet the condition that the relative percentages of both colors must change when the switches are actuated but that their sum must remain constant, it is necessary to distribute the taps of the resistance 311 and 312 in such a way that each step of either rheostat switch changes the output of either lamp by 10 per cent in the chosen example. It is obvious that for this reason the resistance between taps cannot be the same, since the output of a tungsten filament lamp burning at full voltage changes quite rapidly when even a small amount of resistance is introduced, but, at lower voltages, the more resistance is introduced, the less effect it has, so that for the last steps a very high amount of resistance must be added to bring about a change of light output of 10 per cent. This is schematically indicated on Fig. 13, and it can be seen that the resistance between the two upper taps of element 311 is very much less than the resistance between the two lowest taps. Resistance element 312 is arranged in the opposite order, so that when contacts 313 and 314 are rotated in unison the desired effect is obtained.

When resistance is introduced into the supply line of a tungsten filament lamp not only the light output, but also its color temperature changes. When the voltage of the lamp decreases, the light becomes of a more reddish color. In other words a color which is close to the blue end of the spectrum will change relatively rapidly upon addition of resistance, but a color near the red end of the spectrum will change more slowly. Therefore, the resistance which controls the blue filtered light must be somewhat lower than the resistance which controls the light which has to pass a yellow filter, yellow being closer to the red end of the spectrum.

The contrast control is operatively connected with the stepwedge unit as shown in Fig. 2. The two step switches are mounted on a shaft 315, the center line of which is an extension of the center line of the shaft 240 of the cylindrical stepwedge support 244. This shaft 315 carries the aforementioned sliding contacts 313 and 314 which are in electrical contact with one of the switch buttons, respectively. These switch buttons are mounted on plates 316 and 317 made from insulated material and mounted in a suitable way within the lower part of housing 52 as shown. At its right end, shaft 315 carries a disc 318 made from insulated material and which has two holes 319 and 320. These holes are engaged by corresponding pins 321 and 322 fastened to the cylindrical stepwedge print support 244 and forming an operative connection therewith. It can be seen that hole 319 is larger than hole 320, so that the cylindrical stepwedge support 244 can be connected to the rheostats only in one way.

The result of this arrangement is that the light output of the enlarger is automatically adjusted to a color mixture which gives the same contrast as shown by the stepwedge print visible through window 54 at that instant. If hand wheel 60 is rotated, a different stepwedge print is rendered visible, and at the same time, the illumination system of the enlarger is automatically adjusted to a new color mixture corresponding to the one received by this new print. A precaution is necessary because the spectral response of most photo-electric cells changes with the color of the light to which they are submitted. It is, therefore, possible that errors be introduced if the photocell during the measuring process is exposed to the color mixture as adjusted by the coaction of the stepwedge unit and the rheostat switch. To avoid this possible source of error, two additional switches are placed on the same shaft that is actuated by handwheel 65, Fig. 1. The first switch actuated by this hand wheel consisted of the rotary contact 170 sliding on contacts 171 and 172, respectively. Mounted on the same shaft with contact 170 are now two more contacts 330 and 331 which rest either on segments 332 and 333, or on segments 334 and 335. In the position in which 330 and 331 are shown in Fig. 13, they rest on segment 332 and 333, respectively, and thereby short circuit both resistance elements 311 and 312, i. e., in the "measuring" position they render the contrast control ineffective and both lamps 31 and 32 are always supplied with full voltage. As soon as hand wheel 65 is placed into the "exposure" position, contacts 330 and 331 rest on segment 334 and 335, respectively. These segments are unconnected and, therefore, the voltage supplied to lamps 31 and 32 is now controlled by the position in which contact 313 and 314 happen to be as controlled by hand wheel 60 of the stepwedge unit.

The method of operation of the device as equipped with contrast control is substantially identical to the method outlined in a previous paragraph. The zero point is first checked and then the light intensity at several selected points on the easel is measured. When this is done, hand wheel 62 is placed in the "measuring" position. This actuates contact blades 170, 330 and 331. The last named two blades short circuit the resistor elements 311 and 312 of the contrast control and cause both lamps 31 and 32 to receive full voltage regardless of the position of hand wheel 60 and/or switch blades 313 and 314. In other words, any error due to the spectral response of the photocell is eliminated. The light measuring process itself and the subsequent adjustment of hand wheels 59 and 60 is the same as already described. Hand wheel 60, however, is now connected to switch contacts 313 and 314, and automatically adjusts these switches to positions which cause lamps 31 and 32 to emit, during a subsequent exposure, a color mixture identical to the one to which the stepwedge print visible in window 54 was exposed. The manipulation of hand wheels 59 and 60, therefore, has the effect of adjusting the time switch to a proper exposure time and to adjust the contrast control to a proper color mixture for a subsequent exposure.

For an exposure, hand wheel 62 is placed into the "exposure" position, moving switch contacts 170, 330 and 331. The two last named contacts now rest on the unconnected segments 334 and 335, thereby removing the previous short circuit of resistors 311 and 312. Part of these resistors are, therefore, depending upon the position of switch blade 313 and 314, inserted into the supply line of lamps 31 and 32, adjusting them to the desired color mixture as explained. If the operator now depresses push button 161, he receives an exposure which is correctly timed and which has a correct contrast.

It is obvious that various changes of form, proportion, minor details and combination of parts may be resorted to without departing or sacrificing any of the advantages of the invention, as defined in the appended claims.

What we claim as new, is:

1. A print control device for photographic enlargers of the type that projects an image of a transparency on an easel, said device adapted to perform a density prediction and subsequently a timed exposure, and comprising a photocell housing, adapted to be placed on selected points of said easel and containing a photo-electric cell, a connecting cable, and a main housing composed of two parts, the first part of said housing containing a light intensity indicator including, an electric circuit connected to said photoelectric cell by said cable, a moving element in operative relation with said circuit, and a light intensity scale on which said moving element indicates the light intensity at the selected point of the easel at which said photocell housing has been placed, the second part of said housing containing a stepwedge unit, including a movable support carrying a plurality of stepwedge prints made on different grades of sensitized material, each print containing in systematic arrangement a plurality of areas that received exposures of different light intensity × time values, means to make a selected stepwedge print visible to an observer by moving said support, a light intensity × time scale, and means to indicate on said light intensity × time scale the light intensity × time values received by each area of said visible stepwedge print, one of said two parts of said main housing containing a time switch controlling the time for which said image during a subsequent exposure is projected by said enlarger on said easel, including means to adjust said exposure time, and a time scale indicating the exposure time of said subsequent exposure to which said time switch is adjusted, said main housing comprising means to move said two parts relative to each other, including a mechanism operatively connecting said moving means to the aforementioned adjusting means of said time switch, whereby said time switch is automatically adjusted by moving said two parts of said main housing relative to each other, and whereby a slide rule like computing device is formed, indicating for each selected point of the easel on the light intensity × time scale of the second part a light intensity × time value obtained as the product of the measured light intensity value indicated on the light intensity scale of the first part, and of the selected time value indicated on the time scale of said time switch, and whereby one area of said visible stepwedge print shows the predicted print density as obtained on the selected grade of sensitized material after an exposure of the same light intensity × time value.

2. A device according to claim 1, said electric circuit including a condenser adapted to change its voltage when current passes said photo-electric cell as a consequence of light impinging upon it, and said light intensity indicator including means to measure the time required by said condenser to change its voltage by a predetermined magnitude.

3. A device according to claim 1, said electric circuit including a condenser, a first and a second parallel charging circuit operatively connected thereto, said condenser being charged by them simultaneously, said first charging circuit being formed by said photo-electric cell and a first source of voltage, said condenser, said photo-electric cell and said first source of voltage connected in series, whereby said condenser, upon exposure of said photo-electric cell to light, is charged with a rate of speed depending upon the intensity of said light, and said second charging circuit being formed by a second source of voltage, and by means to limit the current of said second charging circuit to a substantially constant value, said condenser, said second source of voltage and said current limiting means connected in series, whereby said condenser is charged with a constant rate of speed, independent of the intensity of said light.

4. A device according to claim 1, said electric circuit including a condenser operatively connected to two parallel charging circuits and adapted to be charged by them simultaneously, said first charging circuit comprising a first source of voltage and a photo-electric cell, said photo-electric cell being of the multiplier type including a photo emissive cathode and $n$ anodes, said source of voltage including a voltage divider with a starting tap and $n$ additional taps, the starting tap being of negative polarity and connected to said cathode, the other taps being progressively more positive and connected to corresponding anodes of said multiplier tube, and said condenser being inserted into the connection between the $(n-1)$st tap and the $(n-1)$st anode, whereby said condenser, upon exposure of said photo-electric cell to light, is being charged with a rate of speed in dependence of the intensity of said light, said second charging circuit comprising a second source of voltage and means to limit the current of said second circuit to a substantially constant value, said second source of voltage, said current limiting means, and said condenser being connected in series, whereby said condenser is being charged with a constant rate of speed, independent of the intensity of said light.

5. A device according to claim 1, said electric circuit including a condenser operatively connected to two parallel charging circuits and adapted to be charged by them simultaneously, said first charging circuit comprising a first source of voltage and said photo-electric cell, said first source of voltage, said photo-electric cell and said condenser connected in series, whereby said condenser, upon exposure of said photo-electric cell to light, is charged with a rate of speed depending upon the intensity of said light, said second charging circuit comprising a second source of voltage and means to limit the current of said second charging circuit to a substantially constant value, said second source of voltage, said current limiting means, and said condenser connected in series, whereby said condenser is charged with a constant rate of speed, independent of the intensity of said light, and means to adjust said current limiting means until, without any light impinging on said photo-electric cell, said condenser is charged by said second charging circuit alone to a predetermined voltage in a predetermined time, whereby any accidental leakage in the circuit of said condenser can be substantially compensated for.

6. A device according to claim 1, said light intensity indicator adapted to run through an operating cycle, said electric circuit comprising a condenser, and a source of current in series with said condenser and said photocell, means to short circuit said condenser before the start of said operating cycle, means to render said short circuiting means inoperative after the start of said operating cycle, whereby said condenser, during said cycle, accumulates a charge which increases at a rate of speed in accordance with the intensity of the light impinging upon said photo-electric cell, and means to terminate said operating cycle when said charge equals a predetermined voltage.

7. A print control device according to claim 1, said light intensity indicator adapted to run through an operating cycle, and said electric circuit comprising a condenser, means to short circuit said condenser before the start of the operating cycle, a first source of direct current in series with said condenser and said photo-electric cell, means to render said short circuiting means inoperable after the start of the operating cycle, whereby said condenser accumulates a charge which increases during the operating cycle at a rate of speed in accordance with the intensity of the light impinging upon said photo-electric cell, and means to terminate said operating cycle when said charge equals a predetermined voltage, including a thyratron with a grid circuit and an anode circuit, said grid circuit comprising a second source of direct current, the positive terminal of said second source connected to the cathode of the thyratron, the negative terminal of said second source connected to the negative terminal of said condenser, and the positive terminal of said condenser connected to the grid of the thyratron, whereby the voltage of said grid with respect to the cathode of said thyratron becomes equal to the difference of the voltages of said second source of direct current and of said condenser, so that the thyratron is rendered non-conducting before and during the operating cycle as long as said condenser voltage is small and the grid therefore highly negatively biased with respect to the cathode, but becomes current conductive at the end of the operating cycle as soon as said voltage difference, due to the rising condenser voltage, falls below a critical value, and said anode circuit including a source of alternating current and a load device, in series connection with said thyratron and said source of alternating current, and actuated by the anode current of said thyratron at the end of the operating cycle.

8. A device according to claim 1, said light intensity indicator comprising said electric circuit including a condenser adapted to change its voltage when current passes said photo-electric cell as a consequence of light impinging upon it, and means adapted to measure the time required by said condenser to change its voltage by a predetermined magnitude, said time measuring means comprising a constant speed motor and means to make the output shaft of said motor rotate during the time required by said condenser for said voltage change, said output shaft driving the aforementioned moving element, whereby the angle of rotation of said shaft and the length of travel of said moving element becomes a measure of said time and thereby of the light intensity impinging upon said photocell.

9. A device according to claim 1, said light intensity indicator adapted to run through an operating cycle, and said electric circuit comprising a condenser, a source of current in series with said condenser and said photo-electric cell, means to short circuit said condenser before the start of an operating cycle, means to render said short circuiting means inoperative after the start of an operating cycle, whereby said condenser, during said operating cycle, accumulates a charge which increases at a rate of speed in accordance with the intensity of the light impinging upon said photo-electric cell, means to terminate said operating cycle when said charge equals a voltage of predetermined magnitude, said light intensity indicator also comprising means to measure the time required by said condenser to accumulate said charge, said time equaling the length of said operating cycle, said time measuring means comprising a constant speed motor with an output shaft, said shaft driving said aforementioned moving element means to make said output shaft rotate during said time to be measured, means urging said shaft to return to its starting position, means maintaining said shaft after the termination of said operating cycle in its most advanced position against said urging means, and means under the control of the operator to render said last named means inoperative for resetting purposes, whereby the length of travel of said moving element from its starting position to its most advanced position becomes a measure of the length of time of said operating cycle and/or of the intensity of the light impinging upon said photoelectric cell.

10. A device according to claim 1, said light intensity indicator adapted to run through an operating cycle, and said electric circuit comprising a condenser, a first source of current in series with said condenser and said photo-electric cell, means to short circuit said condenser before the start of an operating cycle, means to render said short circuiting means inoperative after the start of an operating cycle, whereby said condenser, during said operating cycle, accumulates a charge which increases at a rate of speed in accordance with the intensity of the light impinging upon said photo-electric cell, means to terminate said operating cycle when said charge equals a predetermined voltage, said light intensity indicator also comprising means to measure the time required by said condenser to accumulate said charge, said time equaling the length of said operating cycle and said time measuring means comprising a constant speed motor with an output shaft, said shaft driving said aforementioned moving element, means operated by a set of contacts to make said output shaft rotate during said time to be measured, means urging said shaft to return to its starting position, means maintaining said shaft after the termination of said time in its most advanced position against said urging means, and means under the control of the operator to render said last named means inoperative for resetting purposes, said means to terminate the operating cycle including a thyratron with a grid circuit and an anode circuit, said grid circuit comprising a second source of direct current, the positive terminal of said second source connected to the cathode of the thyratron, the negative terminal of said second source connected to the negative terminal of said condenser, and the positive terminal of said condenser connected to the grid of the thyratron, whereby said thyratron is rendered non-conducting before and during the operating cycle, but becomes conductive at the end of said cycle, said anode circuit including a source of alternating current and a relay with an armature and said set of contacts, said armature in series connection with said thyratron and said source of alternating current, and actuated by the anode current of said thyratron at the end of the operating cycle, whereby the length of travel of said moving element from its starting position to its most advanced position becomes a measure of the length of time of said operating cycle and/or of the intensity of the light impinging upon said photo-electric cell.

11. A device according to claim 1, said photocell housing having a top wall, an aperture in said top wall, and electromagnetic means to change the size of said aperture, said light intensity indicator adapted to run through several operating cycles, said electric circuit comprising a condenser, and a source of current in series with said condenser and said photocell, means to short circuit said condenser before the start of an operating cycle, means to render said short circuiting means inoperative after the start of an operating cycle, whereby said condenser, during said cycle, accumulates a charge which increases at a rate of speed in accordance with the size of said aperture and the intensity of the light impinging upon said photo-electric cell, means to terminate said operating cycle when said charge equals a predetermined voltage, said light intensity indicator also comprising means to measure the length of said operating cycle including a constant speed motor with an output shaft driving said moving element, means to make said shaft rotate during said operating cycle, said means to short circuit said condenser operatively associated with said output shaft and rendered effective at spaced intervals, and means also operatively connected to said shaft to actuate between said intervals said electromagnetic means to change said aperture in said photocell housing, said aperture being made larger during subsequent intervals, whereby said light intensity indicator may run successively through several operating cycles with progressively larger photocell apertures and proportionately increased light sensitivity so that a wide range of light intensity values can be measured.

12. A device according to claim 1, said photocell housing having a top wall, an aperture in said top wall, and electromagnetic means to adjust the size of said aperture, said light intensity indicator adapted to run through several operating cycles, said electric circuit comprising a condenser, and a source of current in series with said condenser and said photocell, means to short circuit said condenser before the start of an operating cycle, means to render said short circuiting means inoperative after the start of an operating cycle, whereby said condenser, during said cycle, accumulates a charge which increases at a rate of speed in accordance with the intensity of the light impinging upon said photoelectric cell, means to terminate said operating cycle when said charge equals a predetermined voltage, said light intensity indicator also comprising, means to measure the length of said operating cycle including a constant speed motor with an output shaft, means to make said shaft rotate during said operating cycle, said means to short circuit said condenser operatively associated with said output shaft and rendered effective at spaced intervals, and means also operatively connected to said shaft to actuate between said intervals said electromagnetic means to adjust said aperture in said photocell housing, said aperture being made larger during subsequent intervals, and a mechanism converting the rotary travel of said shaft into a movement proportional to the logarithmic value of the intensity of the light impinging upon said photocell, said mechanism comprising a cam driven by said output shaft, and a cam following member driven by said cam, said cam following member forming said aforementioned moving element, said cam comprising alternate portions with changing and constant radii, respectively, said portions with constant radii angularly coinciding with said aforementioned spaced intervals during which said condenser is short circuited, and the largest radius of each portion with a changing radius equal to the radius of the adjacent portion with a constant radius and to the smallest radius of the next portion with a changing radius.

13. A device according to claim 1, the second part of said main housing having a front wall with an elongated rectangular window, said movable support for said stepwedge prints being a rotatable cylinder positioned behind said front wall with its axis parallel to the long side of said window and its circumference closely adjacent to said window, whereby one selected stepwedge print can be made visible through said window by rotating said cylinder.

14. A device according to claim 1, the second part of said main housing having a front wall with an elongated rectangular window, said movable support for said stepwedge prints being a rotatable cylinder positioned behind said front wall with its axis parallel to the long side of said window and its circumference closely adjacent to said window, whereby one selected stepwedge print can be made visible through said window by rotating said cylinder, a scale calibrated in logarithmically spaced light intensity × time values affixed to said front wall, and a system of lines connecting individual areas of said visible stepwedge print to points of said scale corresponding, respectively, to light intensity × time values received by said areas, said system of lines forming said means to indicate light intensity × time values for said stepwedge areas.

15. A device according to claim 1, including a contrast control device adapted to adjust the color of the light forming said image projected on said easel during a subsequent exposure and operatively connected to said movable support of said stepwedge prints, said support carrying a plurality of stepwedge prints of different contrasts made on variable contrast paper with light of different colors, one of said prints being visible to an observer, whereby the light forming said projected image during a subsequent exposure, is automatically adjusted to the same color to which said visible stepwedge print was exposed.

16. A device according to claim 1, including means to adjust the color of the light forming said projected image, comprising means to render said color of a fixed spectral composition during the density predicting process, and of a variable spectral composition during the subsequent timed exposure, said last named composition in dependence of a control mechanism in operative connection with said movable support for said stepwedge prints, said support carrying a plurality of stepwedge prints made of different contrast made on variable contrast paper with light of different spectral compositions, one of said prints being visible to an observer, whereby the light forming said projected image during said exposure, is automatically adjusted to the same color to which said visible stepwedge print was exposed.

17. A device according to claim 1, including a contrast adjusting device adapted to change the color of the light forming said image projected on said easel during said subsequent exposure, said contrast adjusting device comprising an illuminating system for said enlarger, and a control device, said illuminating system comprising two lamps, one filter of a different color in front of each lamp, and means to superimpose the colored light beams transmitted by said filters, said control device comprising one rheostat for each lamp, and means to actuate said rheostats simultaneously but electrically in opposite directions, whereby the intensity of one color is increased and the intensity of the other decreased and thereby any desired mixture of the two colors may be obtained, said means operatively connected to said movable support for said stepwedge prints, said support carrying a plurality of stepwedge prints of different contrasts made on variable contrast paper with light of different colors, one of said stepwedge prints being visible to an observer, whereby the light forming said projected image during a subsequent exposure is automatically adjusted to the same color to which said visible stepwedge print was exposed.

18. A device according to claim 1, including a contrast adjusting device adapted to change the color of the light forming said image projected on said easel during said subsequent exposure, said contrast adjusting device comprising an illuminating system for said enlarger, and a control device, said illuminating system comprising two lamps, one filter of a different color in front of each lamp, and means to superimpose the colored light beams transmitted by said filters, said control device comprising one rheostat for each lamp, and means to adjust said rheostats simultaneously but electrically in opposite directions, whereby the intensity of one color is increased and the intensity of the other decreased and thereby any desired mixture of the two colors may be obtained, said means operatively connected to said movable support for said stepwedge prints, and comprising two coaxial rotary switches for said respective rheostats, said support being a rotatable cylinder, its axis being an extension of the axis of said rotary switches and carrying a plurality of stepwedge prints of different contrasts made on variable contrast paper with light of different colors, the second part of said main housing having a front wall with an elongated rectangular window, the long side of said window parallel to the axis of said cylinder, and one of said stepwedge prints on said cylinder visible through said window, whereby the light forming said projected image during a subsequent exposure is automatically adjusted to the same color to which said visible stepwedge print was exposed.

19. A device according to claim 1, said time switch comprising two units, said first unit comprising a constant speed motor with an output shaft, and a cam mounted on said shaft, the shape of said cam determined by the formula $$R = a \log \phi + b$$

where $R$ and $\phi$ are radius and angle, respectively, of a system of polar coordinates, and $a$ and $b$ are constants, said second unit comprising a pivoted lever in operative contact with said cam and adapted to perform a swivel motion when said cam rotates, a switch adapted to be actuated by said lever at the end of said motion, means to start the rotation of said output shaft and simultaneously therewith the light forming said projected image at the beginning of an exposure, and means controlled by said switch to terminate both at the end of said exposure, means to cause said cam and said pivoted lever to return to their respective starting positions after the termination of an exposure, and means to move the cam of the first unit and the pivoted lever of the second unit relative to each other in a direction parallel to the position of said lever before the start of said exposure, whereby the length of said exposure can be adjusted.

20. A device according to claim 1, said time switch comprising two units, said first unit comprising a constant speed motor with an output shaft, and a rotatable cam mounted on said shaft, the shape of said cam determined by the formula $R = a \log \phi + b$, where $R$ and $\phi$ are radius and angle, respectively, of a system of polar coordinates, and $a$ and $b$ are constants, said second unit comprising a rotatable lever in operative contact with said cam and adapted to perform a swivel motion when said cam rotates, a switch adapted to be actuated by said lever at the end of said motion, means to start the rotation of said output shaft and simultaneously therewith the light forming said projected image at the beginning of an exposure, and means controlled by said switch to terminate both at the end of said exposure, means to cause said cam and said lever to return to their respective starting positions after the termination of an exposure, and means to move the rotatable cam of the first unit and the rotatabel lever of the second unit relative to each other in a direction parallel to the position of said lever before the start of said exposure, said rotatable cam being attached to one of the two parts of said main housing but being free to rotate, and said rotatable lever being attached to the other part of said main housing but being free to rotate, whereby the length of an exposure is automatically adjusted when the first part of said main housing is moved relative to said second part.

21. A device according to claim 1, said time switch comprising two units, said first unit comprising a constant speed motor with an output shaft, and a rotatable cam mounted on said shaft, the shape of said cam determined by the formula $R = a \log \phi + b$, where $R$ and $\phi$ are radius and angle, respectively, of a system of polar coordinates, and $a$ and $b$ are constants, said second unit comprising a rotatable lever in operative contact with said cam and adapted to perform a swivel motion when said cam rotates, a switch adapted to be actuated by said lever at the end of said motion, means to start at the beginning of an exposure the rotation of said output shaft and simultaneously therewith the light forming said projected image, and means controlled by said switch to terminate both at the end of said exposure, means to cause said cam and said lever to return to their respective starting positions after the termination of an exposure, means to move the rotatable cam of the first unit and the rotatable lever of the second unit relative to each other in a direction parallel to the position of said lever before the start of said exposure, said rotatable cam being attached to one of the two parts of said main housing but being free to rotate, and said rotatable lever being attached to the other part of said main housing but being free to rotate, a scale with logarithmically spaced exposure time values affixed to one of the parts of said main housing, and a mark, adjacent to said scale, affixed to the other part of said main housing, whereby the length of an exposure is automatically adjusted when said first part of said main housing is moved relative to said second part, and whereby the length of said exposure time is indicated by said mark on said scale.

22. A device according to claim 1, said slide rule like computing device comprising two sections, the first section formed by said exposure time scale and a mark, said scale having logarithmically spaced divisions and affixed to one of the parts of said main housing, and said mark affixed, adjacent to said scale, to the other part of said main housing, the second section formed by said light intensity scale affixed to the first part and said light intensity × time scale affixed to said second part of said main housing, both scales having logarithmically spaced divisions and arranged adjacent to each other, whereby the moving element of said light intensity indicator indicates a light intensity value on one of the divisions of said light intensity scale, and a light intensity × time value on a division of the adjacent light intensity × time scale, the two divisions being in register, and said light intensity × time value being the product of said light intensity value and of the exposure time indicated by said mark on said time scale.

ALFRED SIMMON.
LOUIS L. WEISGLASS.

No references cited.